United States Patent
van den Berg et al.

(10) Patent No.: US 12,118,435 B2
(45) Date of Patent: Oct. 15, 2024

(54) PAULI-LINDBLADIAN BASED NOISE MODELING AND MITIGATION

(71) Applicant: International Business Machines Corporation, Armonk, NY (US)

(72) Inventors: Ewout van den Berg, Bronxville, NY (US); Zlatko Kristev Minev, White Plains, NY (US); Abhinav Kandala, Yorktown Heights, NY (US); Paul Kristan Temme, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 97 days.

(21) Appl. No.: 18/049,684

(22) Filed: Oct. 26, 2022

(65) Prior Publication Data
US 2024/0152795 A1    May 9, 2024

(51) Int. Cl.
*G06N 10/70* (2022.01)
*G06N 10/20* (2022.01)
*G06N 10/40* (2022.01)

(52) U.S. Cl.
CPC .......... *G06N 10/70* (2022.01); *G06N 10/20* (2022.01); *G06N 10/40* (2022.01)

(58) Field of Classification Search
CPC ........ G06N 10/00; G06N 10/20; G06N 10/40; G06N 10/70
See application file for complete search history.

(56) References Cited

U.S. PATENT DOCUMENTS

| | | | |
|---|---|---|---|
| 10,318,874 B1* | 6/2019 | Duncan | G06N 20/00 |
| 11,334,693 B1 | 5/2022 | Flammia | |
| 2020/0410343 A1* | 12/2020 | Niu | G06N 3/092 |
| 2022/0067253 A1 | 3/2022 | Chen et al. | |

(Continued)

FOREIGN PATENT DOCUMENTS

| | | |
|---|---|---|
| CN | 114580649 A | 6/2022 |
| WO | 2021244694 A1 | 12/2021 |

OTHER PUBLICATIONS

Gonzales, Alvin, et al. "Quantum error mitigation by Pauli check sandwiching." arXiv:2206.00215v1 (2022), 14 pages. (Year: 2022).*

(Continued)

*Primary Examiner* — Cynthia Britt
*Assistant Examiner* — Jeffrey Andrew Yang
(74) *Attorney, Agent, or Firm* — Amin, Turocy & Watson, LLP

(57) ABSTRACT

Systems, computer-implemented methods or computer program products to facilitate mitigating quantum errors associated with one or more quantum gates. A noise modeling component can generate a sparse error model of noise associated with one or more quantum gates; employ the sparse error model; and draw samples from an inverse noise model. An insertion component can insert the samples to mitigate errors associated with the one or more quantum gates. The insertion component can reduce the noise by running circuit instances augmented with samples from the inverse noise model. The noise modeling component includes a noise shaping component that can shape the noise affecting one or more quantum gates by twirling to form a Pauli channel.

20 Claims, 12 Drawing Sheets
(5 of 12 Drawing Sheet(s) Filed in Color)

(56) References Cited

U.S. PATENT DOCUMENTS

2022/0114313 A1* 4/2022 Zhang .................. G06N 10/20

OTHER PUBLICATIONS

Lajos Diósi. "Hybrid quantum-classical master equations." Phys. Scr. (2014) 014004, 5 pages. (Year: 2014).*

Van Den Berg, et al., "Probabilistic error cancellation with sparse Pauli-Lindblad models on noisy quantum processors," arXiv:2201.09866v2 [quant-ph] Jun. 23, 2022.

Van Den Berg, et al., "Supplemental material: Probabilistic error cancellation with sparse Pauli-Lindblad models on noisy quantum processors," Jun. 24, 2022.

Marshall, et al., "Noise Suppression via Generalized-Markovian Processes," Physical Review A 96.5 (2017): 052113, 11 pages.

Temme, et al., "Error mitigation for short-depth quantum circuits," Physical review letters 119 (18), 180509 (2017).

Cai, et al., "Constructing smaller Pauli twirling sets for arbitrary error channels," Scientific Reports 1, 1-11 (2019).

Bennett, et al., "Mixed-state entanglement and quantum error correction," Phys. Rev. A 54, 3824 (1996).

Bennett, et al., "Purification of noisy entanglement and faithful teleportation via noisy channels," Phys. review letters 76, 722 (1996).

Knill, et al., "Randomized benchmarking of quantum gates, " Phys. Rev. A 77, 012307 (2008).

Magesan, et al., "Scalable and robust randomized benchmarking of quantum processes," Phys. review letters 106, 180503 (2011).

Flammia, et al., "Efficient estimation of Pauli channels," ACM Transactions on Quantum Computing 1(1), 1-32 (2020).

Kim, et al., "Scalable error mitigation for noisy quantum circuits produces competitive expectation values," arXiv:2108.09197v1 [quant-ph] Aug. 20, 2021.

Harper, et al., "Efficient learning of quantum noise," Nature Physics 16, 1184-1188 (2020).

Harper, et al., "Fast estimation of sparse quantum noise," PRX Quantum 2, 010322 (2021).

Aaronson, et al., "Improved simulation of stabilizer circuits," Physical Review A, 70(5):052328, Nov. 2004.

Bravyi, et al., "Hadamard-free circuits expose the structure of the Cli ord group," arXiv:2003.09412v1 [quant-ph] Mar. 20, 2020.

Bravyi, et al., "Mitigating measurement errors in multiqubit experiments, " Physical Review A, 103(4):042605, 2021.

Breuer, et al., "The theory of open quantum systems," Oxford University Press, 2002, ISBN 13: 9780198520634 (pp. 1-323).

Breuer, et al., "The theory of open quantum systems," Oxford University Press, 2002, ISBN 13: 9780198520634 (pp. 324-645).

Chen, et al., "Robust shadow estimation," arXiv:2011.09636v1 [quant-ph] Nov. 19, 2020.

Van Den Berg, et al., "Model-free readout-error mitigation for quantum expectation values," arXiv:2012.09738v1 [quant-ph] Dec. 17, 2020.

* cited by examiner

PAULI-LINDBLADIAN BASED NOISE MODELING AND MITIGATION

STATEMENT REGARDING PRIOR DISCLOSURES BY THE INVENTOR OR A JOINT INVENTOR

The following disclosures are submitted under 35 U.S.C. 102(b)(1)(A):

DISCLOSURE: [Supplemental material: Probabilistic error cancellation with sparse Pauli-Lindblad models on noisy quantum processors, Ewout van den Berg, Zlatko K. Minev, Abhinav Kandala, Kristan Temme, Jun. 24, 2022, 1-26].

DISCLOSURE: [Probabilistic error cancellation with sparse Pauli-Lindblad models on noisy quantum processors, Ewout van den Berg, Zlatko K. Minev, Abhinav Kandala, Kristan Temme, Jun. 24, 2022, 1-6)].

BACKGROUND

The present disclosure relates to quantum computing noise modeling, and more specifically, to techniques for facilitating noise modeling and error mitigation in quantum computing devices. Quantum computing is generally the use of quantum-mechanical phenomena to perform computing and information processing functions. Quantum computing can be viewed in contrast to classical computing, which generally operates on binary values with transistors. That is, while classical computers can operate on bit values that are either 0 or 1, quantum computers operate on quantum bits (qubits) that comprise superpositions of both 0 and 1. Quantum computing has the potential to solve problems that, due to computational complexity, cannot be solved or can only be solved slowly on a classical computer.

On a large scale, quantum computing cloud service providers can execute millions of quantum jobs for users during a year. Each quantum job can include the execution of one or more quantum programs at a physical logic circuit. Physical, real-world, quantum logic circuits controlled by a quantum system can include a plurality of qubits.

SUMMARY

The following presents a summary to provide a basic understanding of one or more embodiments described herein. This summary is not intended to identify key or critical elements, or delineate any scope of the particular embodiments or any scope of the claims. The sole purpose of the summary is to present concepts in a simplified form as a prelude to the more detailed description that is presented later. In one or more embodiments described herein, systems, devices, computer-implemented methods, and/or computer program products that facilitate error mitigation for quantum computing are described.

According to an embodiment, a system can comprise a memory that stores computer executable components and a processor that executes the computer executable components stored in the memory. The computer executable components can include a noise modeling component that generates a sparse error model of the noise associated with one or more quantum gates. Additionally, the noise modeling component can employ the sparse error model. The noise modeling component can sample from an inverse noise model. Further, the computer executable components can include an insertion component that can insert the samples to mitigate errors associated with the one or more quantum gates. The computer executable components can also include a noise shaping component that can shape the noise affecting the one or more quantum gates by twirling the one or more quantum gates to form a Pauli channel.

According to another embodiment, a computer-implemented method can comprise generating, using a processor operatively coupled to memory, a sparse error model of the noise associated with one or more quantum gates. The computer-implemented method can also comprise employing, using the processor, the sparse error model and sampling an inverse noise model. Additionally, the computer-implemented method can comprise inserting, using the processor, samples from the inverse noise model to mitigate errors associated with the one or more quantum gates. Further, the computer-implemented method can comprise altering (e.g., reducing, altering, etc.), using the processor, the noise by running circuit instances augmented with the samples from the inverse noise model. The computer-implemented method can comprise averaging, using the processor, the circuit instances. Additionally, the computer-implemented method can comprise scaling, using the processor, measured expectation values via noise-model and sample specific constants.

According to another embodiment, a computer program product can comprise a computer readable storage medium having program instructions embodied therewith. The program instructions are executable by a processor that can cause the processor to generate, using the processor operatively coupled to memory, a sparse error model of the noise associated with one or more quantum gates. The program instructions are executable by a processor that can cause the processor to employ the sparse error model and sample from an inverse noise model. Additionally, the program instructions can cause the processor to insert, using the processor, samples from the inverse noise model to mitigate errors associated with the one or more quantum gates. Further, the program instructions are executable by a processor to cause the processor to reduce, using the processor, the noise by running circuit instances augmented with the samples from the inverse noise model. Additionally, the program instructions are executable by a processor to cause the processor to average, using the processor, the circuit instances. The program instructions can cause the processor to scale measured expectation values via noise-model and sample specific constants.

DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
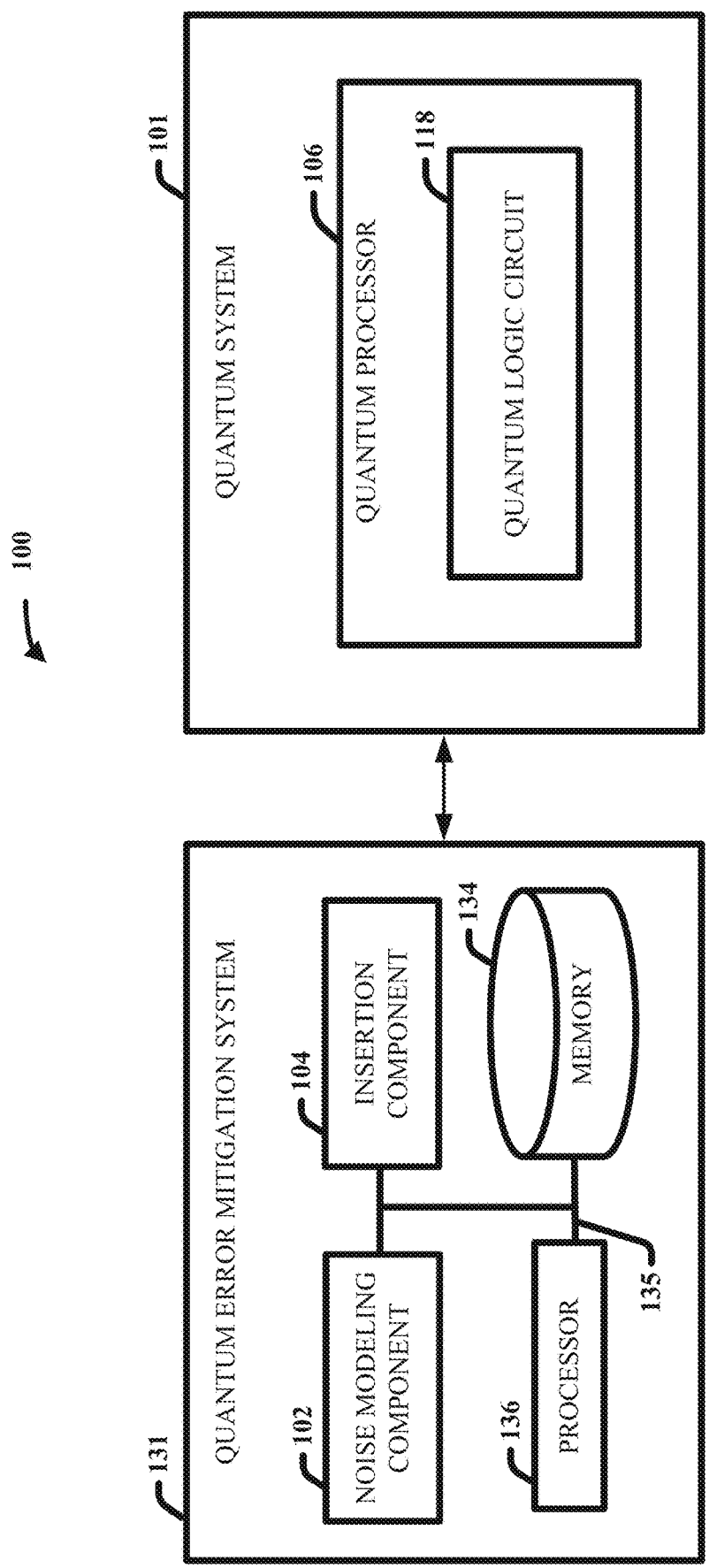
FIG. 1 illustrates a block diagram of an example, non-limiting system that can facilitate mitigating errors associated with one or more quantum gates, in accordance with one or more embodiments described herein.

The following description is merely illustrative and is not intended to limit embodiments and/or application or uses of embodiments. Furthermore, there is no intention to be bound by any expressed or implied information presented in the preceding Background or Summary sections, or in the Detailed Description section. One or more embodiments are now described with reference to the drawings, wherein like reference numerals are utilized to refer to like elements throughout. In the following description, for purposed of explanation, numerous specific details are set forth in order to provide a more thorough understanding of the one or more embodiments. It is evident, however, in various cases, that the one or more embodiments can be practiced without these specific details.

As used herein, a quantum circuit can be a set of operations, such as gates, performed on a set of real-world physical qubits with the purpose of obtaining one or more qubit measurements. A quantum processor can comprise the one or more real-world physical qubits.

Qubit states only can exist (or can only be coherent) for a limited amount of time. Thus, an objective of operation of a quantum logic circuit (e.g., including one or more qubits) can be to maximize the coherence time of the employed qubits. Time spent to operate the quantum logic circuit can undesirably reduce the available time of operation on one or more qubits. This can be due to the available coherence time of the one or more qubits prior to decoherence of the one or more qubits. For example, a qubit state can be lost in less than 100 to 200 microseconds in one or more cases.

Operation of the quantum circuit can be facilitated, such as by a waveform generator (or shifting component), to produce one or more physical pulses and/or other waveforms, signals and/or frequencies to alter one or more states of one or more of the physical qubits. The altered states can be measured, thus allowing for one or more computations to be performed regarding the qubits and/or the respective altered states.

Operations on qubits generally can introduce some error, such as some level of decoherence and/or some level of quantum noise, further affecting qubit availability. Quantum noise can refer to noise attributable to the discrete and/or probabilistic natures of quantum interactions. It is desired to reduce the amount of state-preparation and measurement (SPAM) error resulting from noise of the quantum system.

A two-level system (TLS), among other noise causes, can comprise a source of noise that can cause deterioration of coherence parameters of one or more qubits of a quantum logic circuit. The noise can couple to a low-energy thermal fluctuator, for example, and can randomly change energy of the noise in the vicinity of a qubit frequency. The qubit frequency is the resonance frequency of a qubit energy transition between two states such as, but not limited to, the ground and first excited states of the qubit. The vicinity of a qubit frequency is a frequency range which in some embodiments can range from about 10 megahertz (MHz) below the qubit frequency to about 10 MHz above the qubit frequency. In other embodiments, the vicinity of a qubit frequency can range from about 100 MHz below the qubit frequency to about 100 MHz above the qubit frequency. In still other embodiments, the vicinity of a qubit frequency can range from about 1 gigahertz (GHz) below the qubit frequency to about 1 GHz above the qubit frequency. Without being limited to theory, it is believed that such two-level systems can be caused by atomic scale defects in surface oxides on the metals and/or on the silicon of a physical real-world qubit and can be electromagnetically active. Indeed, a qubit, such as a transmon itself is a resonator with an electromagnetic excitation, and thus a qubit excitation can couple with a two-level system (TLS) and can cause performance issues for a quantum logic circuit, such as, but not limited to, deterioration of qubit parameters.

Due to presence of two-level systems in/at the quantum system and/or due to maintenance and/or diagnostics to be performed relative to coherence times of a particular qubit, one or more qubits, such as superconducting qubits, can be unavailable and/or not recommended for use with the quantum logic circuit, even if desired for use. Furthermore, absent understanding of such two-level systems and their associated fluctuations relative to the frequency domain of one or more qubits of a quantum system, coherence of the qubit can be affected. Loss of coherence can cause failure of execution of a quantum circuit, thus wasting power, time, queue space and/or memory relative to a queue of jobs to be performed on a respective quantum system.

There can be varying causes for loss of qubit coherence. Some causes of decoherence can be equipment related. When coherence of a qubit suddenly changes, or changes gradually over time, one or more existing solutions can comprise not employing the qubit until the coherence deterioration is reduced or ends altogether, such as compared to historical coherence parameters for the particular qubit. Absent understanding, such as definitive understanding, that the change in qubit coherence parameters is caused by a two-level system, unnecessary diagnostics and/or maintenance can be performed, such as switching out cables, swapping control electronics, warming up a super-cooled refrigeration system of the quantum system to troubleshoot components, and/or the like. Also, even when a TLS is suspected as a culprit of noise issues, existing techniques for analyzing the frequency space about a qubit's unperturbed frequency, can be cumbersome, timely, resource intensive, and/or manually intensive relative to at least the scheduling and operation of associated diagnostics. The unperturbed frequency of the qubit is the resonance frequency of the qubit as fabricated, in the absence of external effects that may shift its frequency, including but not limited to magnetic flux bias, DC electric field, mechanical strain, and/or an Autler-Townes (AT) effect.

In view of unintended or unforeseen noise/decoherence, waste of quantum resources, time, power, and/or labor can occur. Indeed, because quantum processors and quantum systems are scarce and costly resources, such waste can be detrimental to both users and administrators of quantum systems. Put another way, each quantum processor can have a fixed number of qubits it supports. When quantum circuits cannot use the full capacity of a quantum processor, one or more qubits can remain idle. Thus, it can be desired to facilitate a process for generating a sparse error model of noise associated with quantum gates, employing the sparse error model and drawing samples from the inverse noise model, and inserting the samples to mitigate errors associated with the quantum gates.

Moreover, different quantum circuits can require varying resources. For example, one quantum circuit can use different physical qubits of a quantum logic circuit of a respective quantum system than another quantum circuit. During scheduling of quantum jobs from a queue and corresponding mapping of quantum circuits to a quantum logic circuit, particular qubits can be desirable for use with one quantum circuit as compared to other qubits of a same quantum logic circuit. Quantum noise, such as two-level systems can therefore interfere, often unknowingly, with this mapping. Therefore, device designs that can mitigate errors of the quantum system can be desirable.

To address the aforementioned presence of two-level systems, lack of information regarding qubit coherence parameters, and/or diagnostics/maintenance to address noise, described herein are one or more embodiments of a system, computer-implemented method and/or computer program product that can mitigate errors associated with one or more quantum gates.

By employing the one or more embodiments described herein, the understanding can further facilitate informed use of the qubit, informed diagnostics of the qubit, and moreover, informed diagnostics/maintenance/calibration/setup of the quantum processor comprising the qubit. This can include optimization of mapping of a quantum circuit, queuing of quantum jobs, and/or general use of a particular qubit of a quantum processor. Indeed, such understanding can be gained, such as separately on a qubit-by-qubit basis, to gain an understanding regarding frequency space about a group of qubits of a quantum processor or other quantum device.

Generally, most quantum applications combine classical computing with the execution of one or more sets of quantum circuits on the quantum processor. Each circuit execution can roughly be thought of as consisting of three phases: (1) initialization of the quantum processor to the $|0\rangle$ ground state; (2) application of the gates that make up the quantum circuit; and (3) measurement of the qubits of interest. For each circuit, this process can be repeated multiple times to obtain the desired measurement statistics. The process of running a quantum circuit is affected by different sources of noise. The noise associated with the first and last stage is usually combined into state-preparation and measurement (SPAM) error. To that end, learning correlated noise channels in large quantum circuits has been a major challenge.

Due to improvements in quantum hardware and control systems, quantum processors are able to provide more qubits with longer coherence times and better gate fidelities. However, despite these improvements, the levels of noise in current quantum processors still limit the depth of quantum circuits and reduce the accuracy of measured observables. Nevertheless, there is a growing number of quantum applications that can run on noisy quantum processors and still provide competitive results. Fault tolerance using quantum error correction or similar techniques would solve many noise-related issues, but until achieved, quantum error mitigation can be used. Unlike error correction, which ensures that quantum circuits can be executed faithfully, error mitigation only aims to produce accurate expectation values $\langle A \rangle$ of observables A.

In embodiments, probabilistic error cancellation (PEC) can be used for error mitigation of quantum systems. To implement the error mitigated action $\mathcal{U}(\rho)=U\rho U^\dagger$ of an ideal quantum gate U on devices where only noisy operations $U\circ\Omega$ are available, the protocol first requires an accurate noise model $\Lambda$ (e.g., such as to generate an accurate noise model $\Lambda$ of noise channel $\Omega$). The action of the ideal quantum gate can be obtained by applying the mathematical inverse $\Lambda^{-1}$ before the noise gate. Although $\Lambda^{-1}$ is not a physical operation, it can be expressed as a linear combination of quantum gates and state-preparation operations. The PEC protocol can implement the linear combination on average by promoting it to a quasi-probability distribution.

Sampling the distribution can generate physical circuit instances and results in an expectation value $\langle \hat{A}_N \rangle$ that is unbiased and completely removes the effect of $\Lambda$; however, this comes at the expense of an increased sampling overhead, denoted by $\gamma$, which captures the noise strength and the resulting increase of the standard deviation. Generating circuit instances can be defined as generating the associated quantum circuit for a number of iterations (e.g., shots) to measure qubit values based on the quantum gate composition. Further, noise models can be predicted and factored into the output of the quantum circuit to produce faster and more accurate results in quantum computing (e.g., running circuit instances and measuring associated qubit/quantum values). Despite the method's theoretical appeal, practical challenges have limited its demonstration to the one-qubit and two-qubit levels. The main difficulty has been the accurate representation of the noise in a full device, which is particularly complicated by cross-talk errors that occur during the parallel application of quantum gates. As a result, protocols including quasi-probability distribution for mitigation can be determined by minimizing the deviation of a set of measured and exact expectation values. Fully scalable implementations of PEC include: i) a noise model Λ that can accurately capture correlated errors across all qubits; ii) a compact representation that can be learned efficiently; and (iii) an inverse representation that enables tractable sampling from the associated quasi-probability distribution.

Given these problems, one or more embodiments described herein can be implemented to produce a solution to one or more of these problems in the form of systems, computer-implemented methods, and/or computer program products that can facilitate the following processes: a) generating, using a processor coupled to memory, a sparse error model of the noise associated with one or more quantum gates; b) employing, using the processor, the sparse error model and sampling, using the processor, an inverse noise model; and c) inserting, using the processor, samples from the inverse noise model to mitigate errors associated with the one or more quantum gates. Further, sampling the sparse error model can include taking an average over a number of circuit instances (e.g., shots) and scaling the averaged results by a noise specific constant to improve quantum expectation values. The estimation of individual fidelities for the quantum system can be determined by sampling random circuit instances and processing the correlating measurements. That is, embodiments described herein include one or more systems, computer implemented methods, apparatuses and/or computer program products that can facilitate one or more of the aforementioned processes.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Figure 2:
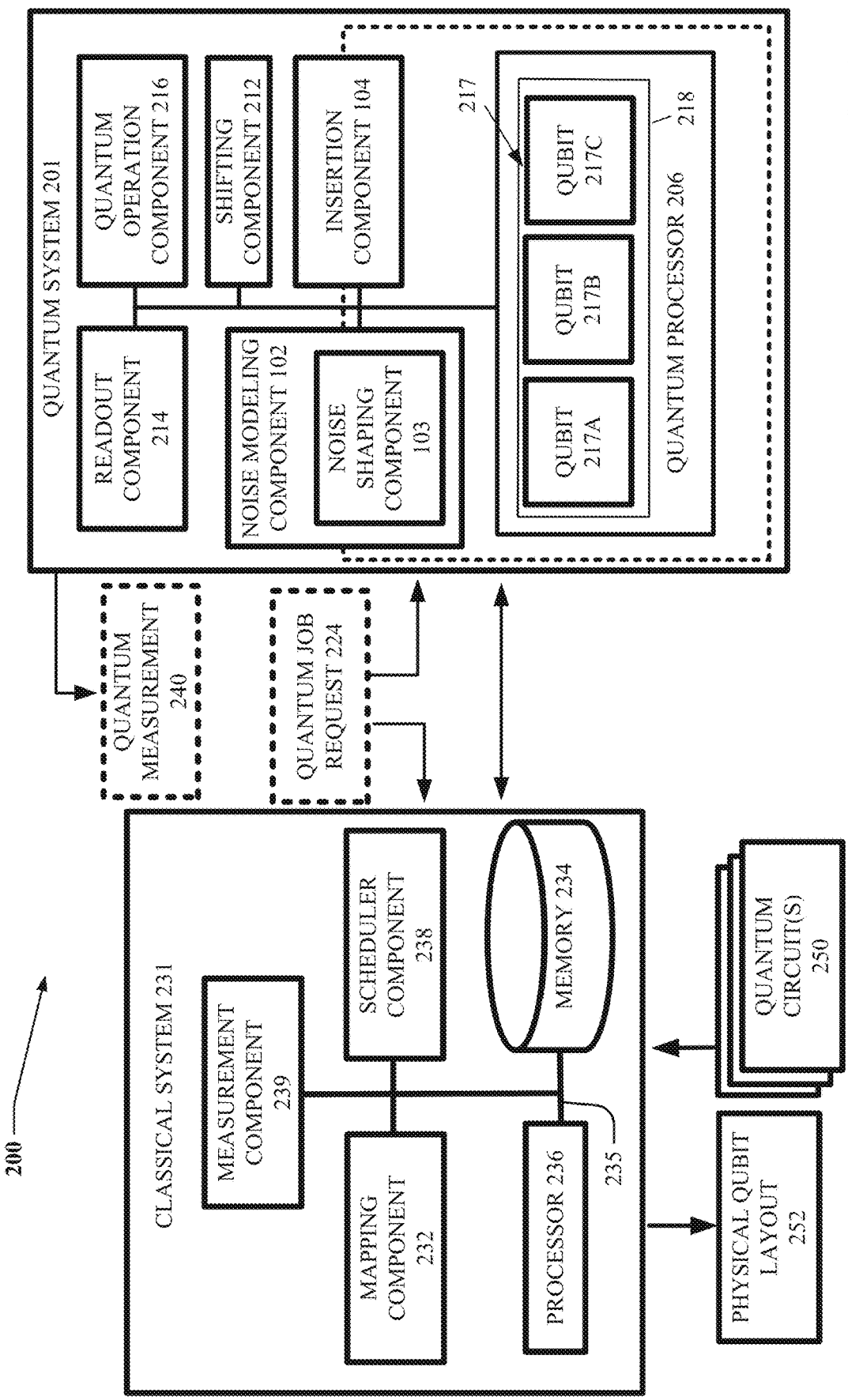
FIG. 2 illustrates a block diagram of an example, non-limiting system that can facilitate mitigating errors associated with one or more quantum gates, in accordance with one or more embodiments described herein.

Further, the embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting systems described herein, such as non-limiting systems 100 and/or 200 as illustrated at FIGS. 1 and 2, and/or systems thereof, can further comprise, be associated with and/or be coupled to one or more computer and/or computing-based elements described herein with reference to an operating environment, such as the operating environment 800 illustrated at FIG. 8. In one or more described embodiments, computer and/or computing-based elements can be used in connection with implementing one or more of the systems, devices, components and/or computer-implemented operations shown and/or described in connection with FIGS. 1 and/or 2 and/or with other figures described herein.

Turning first generally to FIG. 1, one or more embodiments described herein can include one or more devices, systems and/or apparatuses that can facilitate quantum error mitigation. For example, FIG. 1 illustrates a block diagram of an example, non-limiting system 100 that comprises a noise modeling component 102 and an insertion component 104. The system 100 can run circuit instances augmented with samples from an inverse noise model sampled by the noise modeling component 102. Additionally, the insertion component 104 can insert the samples to mitigate errors associated with one or more quantum gates. Repetitive description of like elements employed in other embodiments described herein is omitted for sake of brevity. Aspects of systems (e.g., the system 100 and the like), apparatuses or processes in various embodiments of the present invention can constitute one or more machine-executable components embodied within one or more machines (e.g., embodied in one or more computer readable mediums (or media) associated with one or more machines). Such components, when executed by the one or more machines (e.g., computers, computing devices, virtual machines, a combination thereof, and/or the like) can cause the machines to perform the operations described.

It should be appreciated that the embodiments depicted in various figures disclosed herein are for illustration only, and as such, the architecture of embodiments is not limited to the systems, devices and/or components depicted therein, nor to any particular order, connection and/or coupling of systems, devices and/or components depicted therein. For example, in some embodiments, the system 100 can further comprise various computer and/or computing-based elements described herein with reference to computing environment 800 and FIG. 8. In several embodiments, computer and/or computing-based elements can be used in connection with implementing one or more of the systems, devices, components and/or computer-implemented operations shown and described in connection with FIG. 1 or with other figures disclosed herein.

As illustrated at FIG. 1, the non-limiting system 100 can comprise a classical system 131 (also herein referred to as the quantum error mitigation system 131) and a quantum system 101. The quantum system 101 can comprise at least a quantum processor 106 having a quantum logic circuit 118 comprising at least one or more qubits. The classical system 131 can comprise one or more components, such as a memory 134, quantum processor 136, bus 135, noise modeling component 102 and/or insertion component 104.

Turning next to FIG. 2, the figure illustrates a diagram of an example, non-limiting system 200 that can facilitate generating a sparse error model of noise associated with quantum gates, thereby facilitating a process to mitigate errors associated with the one or more quantum gates of the system. For example, FIG. 2 illustrates a block diagram of an example, non-limiting system 200 that can employ a noise modeling component 102 (e.g., including a noise shaping component 103), an insertion component 104, a shifting component 212 to affect a qubit 217, and a readout component 214 that can be employed to measure one or more characteristics of the affected qubit 217. In response, the non-limiting system 200 can employ the noise modeling component 102 to generate the sparse error model via a sparse Pauli fidelity measurement protocol, where the sparse error model is a parsimonious error model.

Repetitive description of like elements and/or processes employed in respective embodiments is omitted for sake of brevity. As indicated previously, description relative to an embodiment of FIG. 1 can be applicable to an embodiment of FIG. 2. Likewise, description relative to an embodiment of FIG. 2 can be applicable to an embodiment of FIG. 1.

In one or more embodiments, the non-limiting system 200 can be a hybrid system and thus can include both a quantum system and a classical system, such as a quantum system 201 and a classical-based system 231 (also herein referred to as a classical system 231). In one or more other embodiments, the quantum system 201 can be separate from, but function in combination with, the classical system 231. In one or more embodiments, one or more components of the quantum system 201, such as the readout component 214, can be at least partially comprised by the classical system 231, or otherwise comprised external to the quantum system 201. In one or more embodiments, one or more components of the classical system 231, such as the mapping component 232, the scheduler component 238 or the measurement component 239 can be at least partially comprised by the quantum system 201, or otherwise comprised external to the classical system 231 (also herein referred to as the quantum error mitigation system 231).

One or more communications between one or more components of the non-limiting system 200 can be facilitated by wired and/or wireless means including, but not limited to, employing a cellular network, a wide area network (WAN) (e.g., the Internet), and/or a local area network (LAN). Suitable wired or wireless technologies for facilitating the communications can include, without being limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (Ipv6 over Low power Wireless Area Networks), Z-Wave, an ANT, an ultra-wideband (UWB) standard protocol and/or other proprietary and/or non-proprietary communication protocols.

Turning first to the quantum system 201, generally based on a quantum job request 224, on physical qubit layouts 252, and/or on an associated queue of quantum circuits 250 to be executed, the quantum operation component 216 and/or quantum processor 206 can direct execution of the quantum circuits at the quantum logic circuit 218.

Generally, the quantum system 201 (e.g., quantum computer system, superconducting quantum computer system and/or the like) can employ quantum algorithms and/or quantum circuitry, including computing components and/or devices, to perform quantum operations and/or functions on input data to produce results that can be output to an entity. The quantum circuitry can comprise quantum bits (qubits), such as multi-bit qubits, physical circuit level components, high level components and/or functions. The quantum circuitry can comprise physical pulses that can be structured (e.g., arranged and/or designed) to perform desired quantum functions and/or computations on data (e.g., input data and/or intermediate data derived from input data) to produce one or more quantum results as an output. The quantum results, e.g., quantum measurement 240, can be responsive to the quantum job request 224 and associated input data and can be based at least in part on the input data, quantum functions and/or quantum computations.

In one or more embodiments, the quantum system 201 can comprise quantum components, such as a quantum operation component 216, a quantum processor 206, shifting component 212 (e.g., a waveform generator) and/or a readout component 214. In other embodiments, the readout component 214 can be comprised at least partially by the classical system 231 and/or be external to the quantum system 201. The quantum processor 206 can comprise the quantum logic circuit 218 comprising one or more, such as plural, qubits 217. Individual qubits 217A, 217B and 217C, for example, can be fixed frequency and/or single junction qubits, such as transmon qubits.

The quantum processor 206 can be any suitable processor. The quantum processor 206 can generate one or more instructions for controlling the one or more processes of the quantum operation component 216 and/or for controlling the quantum logic circuit 218.

The quantum operation component 216 can obtain (e.g., download, receive, search for and/or the like) a quantum job request 224 requesting execution of one or more quantum programs 250 and/or a physical qubit layout 252 generated by the classical system 231. The quantum job request 224 can be provided in any suitable format, such as a text format, binary format and/or another suitable format. In one or more embodiments, the quantum job request 224 can be received by a component other than of the quantum system 201, such as a by a component of the classical system 231.

The quantum operation component 216 can determine one or more quantum logic circuits, such as the quantum logic circuit 218, for executing a quantum program. In one or more embodiments, the quantum operation component 216/quantum processor 206 can direct the shifting component 212 to generate one or more pulses, tones, waveforms and/or the like to affect one or more qubits 217.

The shifting component 212 can generally perform one or more quantum processes, calculations and/or measurements for shifting the frequency of one or more qubits 217, such as when in respective excited states. For example, the shifting component 212 can operate one or more qubit effectors, such as qubit oscillators, harmonic oscillators, pulse generators and/or the like to cause one or more pulses to stimulate and/or manipulate the state(s) of the one or more qubits 217 comprised by the quantum system 201, and thus can be and/or comprise a waveform generator. In one or more other embodiments, additionally and/or alternatively, the shifting component 212 can facilitate application of flux bias/flux tuning to one or more qubits. This shifting can be employed, as briefly described above, relative to probing of frequency space about the qubit frequency of the qubit, to thereby facilitate measurement of one or more qubit parameters at the shifted frequency.

The readout component 214 can facilitate transmission, e.g., readout, of one or more readings, signals and/or the like to the classical system, such as to the measurement component 242. From the readout, the measurement component 239 can determine one or more energy relaxation measurements at the qubit frequency or at a shifted frequency of the qubit.

Generally, the operations can allow for better understanding and/or planning of the quantum job queue, qubit decay and/or qubit coherence relative to the quantum logic circuit 218. As indicated, the diagnostics and operations of the quantum system 201 can be performed at any suitable interval to thereby facilitate the frequency space mapping of one or more of the qubits 217. As indicated, a suitable interval can be between execution of quantum jobs and/or at a defined and uniform interval, such as every 6 hours, every 3 hours, every 1 hour and/or any other suitable interval. The diagnostic processes to be discussed can be performed on any number, one or more, of the qubits 217 of the quantum logic circuit 218 to gain a better understanding of frequency space about the qubit frequencies of these qubits 217.

Further, the aforementioned description(s) refer(s) to the operation of a single set of diagnostics run on a single qubit. However, employment of the diagnostics can be facilitated, where suitable at one or more qubits at a time of a quantum system. For example, non-neighbor qubits of a qubit logic circuit can be simultaneously measured.

Turning now to the classical system specifically, generally, the classical system 231 can comprise any suitable type of component, machine, device, facility, apparatus and/or instrument that comprises a processor and/or can be capable of effective and/or operative communication with a wired and/or wireless network. All such embodiments are envisioned. For example, the classical system 231 can comprise a server device, computing device, general-purpose computer, special-purpose computer, quantum computing device (e.g., a quantum computer), tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players and/or another type of device and/or computing device. Likewise, the classical system 231 can be disposed and/or run at any suitable device, such as, but not limited to a server device, computing device, general-purpose computer, special-purpose computer, quantum computing device (e.g., a quantum computer), tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players and/or another type of device and/or computing device.

The classical system 231 can comprise a plurality of components. The components can include a memory 234, processor 236, bus 235, mapping component 232, scheduler component 238, and measurement component 239. It is noted that while the mapping component 232, the scheduler component 238, and the measurement component 239 are shown as being comprised by the classical system 231, in one or more other embodiments, any one or more of these components can be comprised by the quantum system 201 or be external to the at least partially external to the classical system 231.

Generally, the classical system 231 can facilitate receipt of a quantum job request 224 and/or receipt of one or more quantum circuits 250 to be operated on the quantum system 201 relative to the quantum logic circuit 218 of the quantum system 201. The quantum circuits 250 can be mapped to one or more physical qubit layouts 252 by the classical system 231, such as based on the readout data from the quantum system 201 and further based on the use of that readout data by the measurement component 239 of the classical system.

Discussion first turns briefly to the processor 236, memory 234 and bus 235 of the classical system 231. For example, in one or more embodiments, the classical system 231 can comprise the processor 236 (e.g., computer processing unit, microprocessor, classical processor, quantum processor and/or like processor). In one or more embodiments, a component associated with classical system 231, as described herein with or without reference to the one or more figures of the one or more embodiments, can comprise one or more computer and/or machine readable, writable and/or executable components and/or instructions that can be executed by processor 236 to facilitate performance of one or more processes defined by such component(s) and/or instruction(s). In one or more embodiments, the processor 236 can comprise the mapping component 232, scheduler component 238, and measurement component 239.

In one or more embodiments, the classical system 231 can comprise the computer-readable memory 234 that can be operably connected to the processor 236. The memory 234 can store computer-executable instructions that, upon execution by the processor 236, can cause the processor 236 and/or one or more other components of the classical system 231 (e.g., mapping component 232, scheduler component 238, and measurement component 239) to perform one or more actions. In one or more embodiments, the memory 234 can store computer-executable components (e.g., mapping component 232, scheduler component 238, and/or measurement component 239).

The classical system 231 and/or a component thereof as described herein, can be communicatively, electrically, operatively, optically and/or otherwise coupled to one another via a bus 235. Bus 235 can comprise one or more of a memory bus, memory controller, peripheral bus, external bus, local bus, quantum bus and/or another type of bus that can employ one or more bus architectures. One or more of these examples of bus 235 can be employed.

In one or more embodiments, the classical system 231 can be coupled (e.g., communicatively, electrically, operatively, optically and/or like function) to one or more external systems (e.g., a non-illustrated electrical output production system, one or more output targets, an output target controller and/or the like), sources and/or devices (e.g., classical and/or quantum computing devices, communication devices and/or like devices), such as via a network. In one or more embodiments, one or more of the components of the classical system 231 and/or of the non-limiting system 200 can reside in the cloud, and/or can reside locally in a local computing environment (e.g., at a specified location(s)).

In addition to the processor 236 and/or memory 234 described above, the classical system 231 can comprise one or more computer and/or machine readable, writable and/or executable components and/or instructions that, when executed by processor 236, can facilitate performance of one or more operations defined by such component(s) and/or instruction(s).

Turning now to the additional components of the classical system 231 (e.g., the mapping component 232, scheduler component 238, and/or measurement component 242), generally, quantum circuits 250 received and/or obtained by the classical system 231 can be analyzed, such as by one or both of the mapping component 232 and scheduler component 238. Based on information from the quantum system 201, the mapping component 232 can map a quantum circuit 250 to a physical qubit layout 252 of the quantum processor 206 (e.g., of one or more qubits of the quantum logic circuit 218). The scheduler component 238, based on additional information from the quantum system 201 and on the mapping information from the mapping component 232, can schedule execution of the quantum circuits 250 in a queue. The additional information from the quantum system 201 can comprise times for running iterations of quantum circuits, times for diagnostic checks, setup, calibration and/or maintenance, and/or the like.

This mapping can be facilitated based on which one or more qubits 217 can be available for execution absent interruption by a TLS and/or other noise of the frequency space about the qubit frequency and/or about a shifted frequency to which the qubit will be moved during an execution of a quantum program 250.

The following description(s) refer(s) to a single set of operations relative to a single qubit. However, employment of the operations of the classical system 231 can be facilitated, where suitable for one or more qubits at a time of a quantum system. For example, measurements can be taken, and estimations performed relative to one or more qubits at a time and/or relative to one or more time ranges for one or more qubits at a time.

Additional description of functionalities will be further described below with reference to the example embodiments of FIGS. 1, 2, 3A, 3B, and 3C, where repetitive description of like elements and/or processes employed in respective embodiments is omitted for sake of brevity.

Figure 3A:
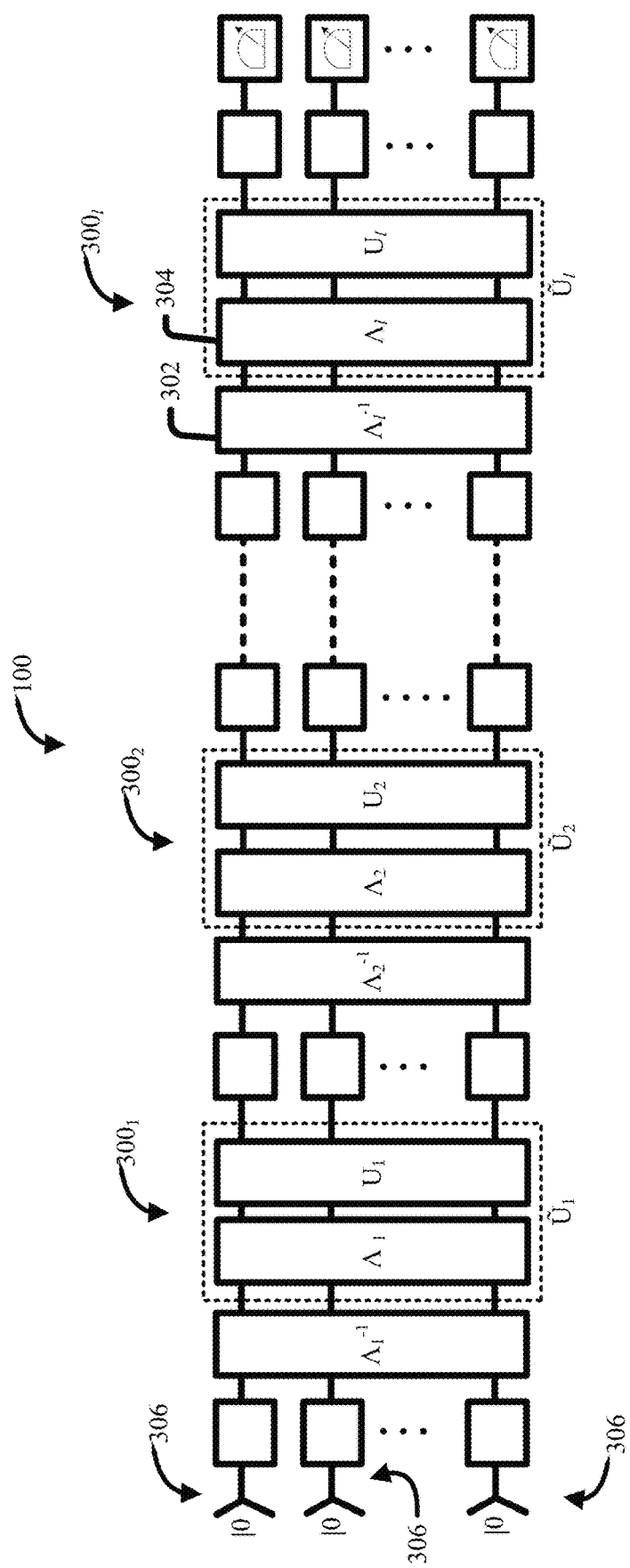
FIG. 3A illustrates a block diagram of an example, non-limiting error mitigation circuit consisting of l layers of noisy two-qubit gates interleaved with layers of single-qubit gates, in accordance with one or more embodiments described herein.
Figure 3B:
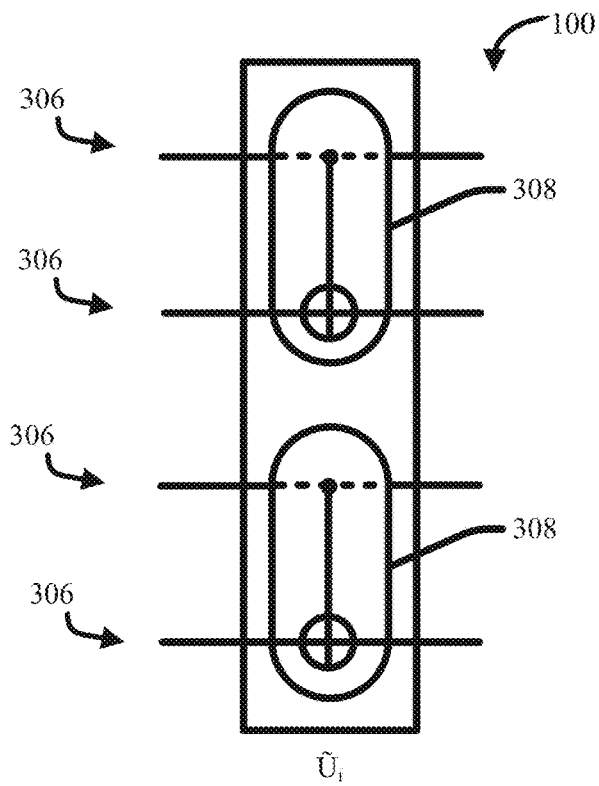
FIG. 3B illustrates a block diagram of a layer consisting of two noisy cx gates, in accordance with one or more embodiments described herein.
Figure 3C:
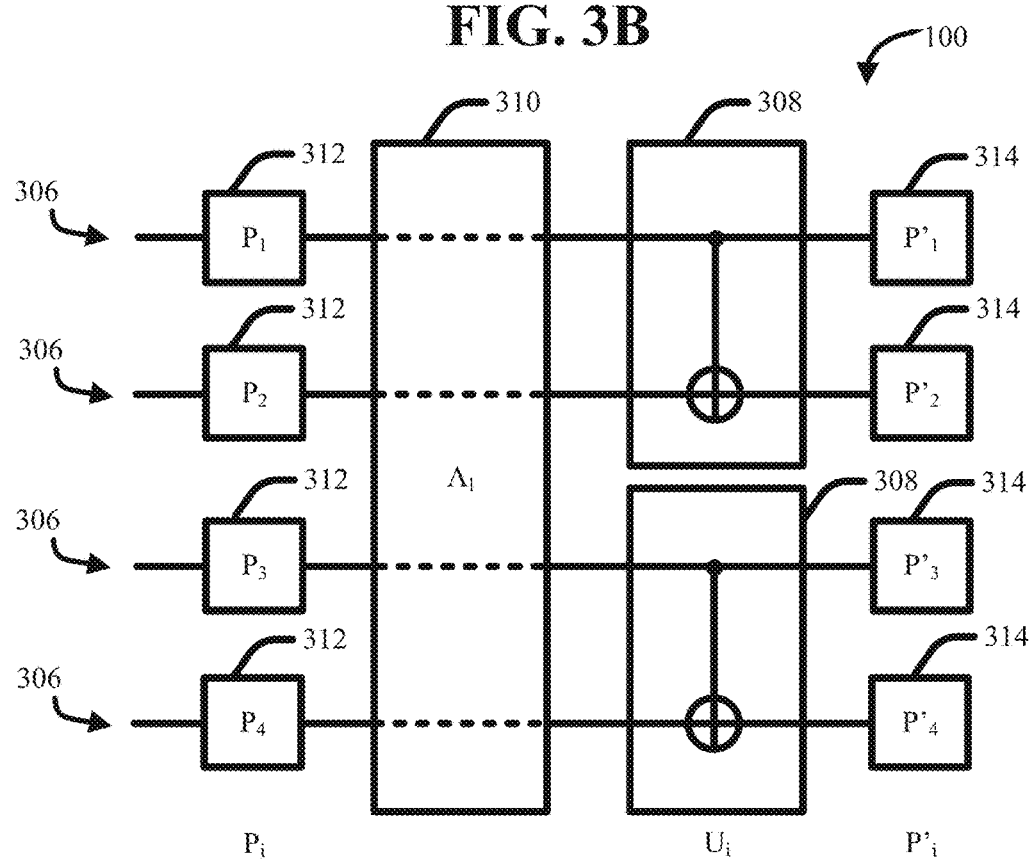
FIG. 3C illustrates a block diagram of an expansion of the layer of FIG. 2B in terms of the ideal gates $\mathcal{U}_i$ and noise model $\Lambda_i$, flanked with Pauli-twirl gates $\mathcal{P}_i$ and $\mathcal{P}_i = \mathcal{U}_i \mathcal{P}_i \mathcal{U}_i^\dagger$, in accordance with one or more embodiments described herein.

In embodiments, FIGS. 1 and 2 illustrate block diagrams of example, non-limiting quantum error mitigation systems 100 that can address the challenges of quantum error mitigation in accordance with one or more embodiments described herein. Quantum circuits can consist of l layers of noisy two-qubit gates interleaved with layers of single-qubit gates. The layers (e.g., each layer i=1, . . . , l) can consist of a noisy operator $\tilde{\mathcal{U}}_i$ 300$_i$ (e.g., 300$_1$ and 300$_2$) and can be error mitigated by inverse noise channel $\Lambda_i^{-1}$ 302 (as shown in FIG. 3A). The noise channel $\Lambda_i$ 304 is specific to the one or more quantum gates in layer i and is assumed to be a Pauli channel. Further, the noise modeling component 102 and the noise shaping component 103 can shape the noise affecting the one or more quantum gates by twirling the one or more quantum gates to form a Pauli channel. In embodiments, FIG. 3B illustrates an embodiment of the system 100 that includes two noisy cx gates 308. Further, FIG. 3C illustrates an expansion of the layer shown in FIG. 3B in terms of the ideal gates $\mathcal{U}_i$ and noise channel A; 310 flanked with Pauli-twirl gates $\mathcal{P}_i$ 312 and $\mathcal{P}_{i'} = \mathcal{U}_i \mathcal{P}_i \mathcal{U}_i^\dagger$ 314 where $\mathcal{P}_i$ 312 is sampled uniformly at random.

In embodiments, the system 100 can model the noise across each layer of two qubit gates as a sparse Pauli-Lindblad error model (e.g., a parsimonious error model). For example and without limitation, the model can include weight-one and weight-two Pauli terms (e.g., whose support coincides with the processor's 136 connectivity). The parameters of the resulting model (e.g., the sparse Pauli-Lindblad error model) can scale linearly with the number of qubits 306, which can ensure that the model is efficiently represented and easy to learn. An inverse noise model can be obtained, via the noise modeling component 102, by negating the model coefficients and can give rise to a quasi-probability distribution on Pauli matrices. The quantum error mitigation system 100 can efficiently sample the quasi-probability distribution in linear time with the number of model coefficients and combine the sampled distribution with single-qubit operations in the interleaved layers. Thus, system 100 can maintain the original circuit structure and can change the classical distribution of the single-qubit gates.

As noted above, the sparse Pauli-Lindblad error model can be generated by the system 100. Further, the noise modeling component 102 and the noise shaping component 103 can generate the sparse Pauli-Lindblad error model. In embodiments, the system 100 models a given n-qubit Pauli noise channel that arises from a sparse set of local interactions, according to a Lindblad Master equation with generator given:

$$\mathcal{L}(\rho) = \Sigma_{k \in \mathcal{K}} \lambda_k (P_k \rho P_k^\dagger - \rho), \quad (1)$$

$$\mathcal{L}(\rho) = \sum_{k \in \mathcal{K}} \lambda_k (P_k \rho P_k^\dagger - \rho)$$

where $\mathcal{K}$ represents a set of local Paulis $P_k$ and $\mu_k$ denotes the corresponding model coefficient. The resulting model is then given by:

$$\Lambda(\rho) = \exp[\mathcal{L}](\rho) = \prod_{k \in \mathcal{K}} (w_k \cdot + (1 - w_k) P_k \cdot P_k^\dagger) \rho, \quad (2)$$

where $w_k = 2^{-1}(1 + e^{-2\lambda_k})$. The model terms $\mathcal{K}$ can be chosen to reflect the noise interactions in the quantum processor and their number, which determines the model complexity and expressivity, typically scaling polynomially in n and therefore allows for representation of noise models for the full device by a small set of nonnegative coefficients $\lambda_k$.

For example, the fidelity of a Pauli matrix $P_b$ with respect to $\Lambda$ is given by:

$$f_b = \frac{1}{2^n} Tr(P_b^\dagger \Lambda(P_b)), \quad (3)$$

The system 100 can define the symplectic inner product $\langle b, k \rangle_{sp}$ to be 0 if Paulis $P_b$ and $P_k$ commute, and 1 otherwise. In doing so, the relationship between model coefficients $\lambda$ and the vector $f = \{f_b\}_{b \in B}$ of fidelities for an arbitrary set of Paulis $\mathcal{B}$ can be concisely expressed as $\log(f) = -2M(\mathcal{B}, \mathcal{K})\lambda$, where the logarithm can be applied elementwise and the entries of binary matrix $M(\mathcal{B}, \mathcal{K})$ can be given by $M_{b,k} = \langle b, k \rangle_{sp}$. In embodiments, for a given $\lambda$ this allows a fidelity evaluation of any set of Paulis $\mathcal{B}$. Further, the relationship allows fitting of physical model parameters, $\lambda \geq 0$, given the fidelity estimates $\hat{f}$ for a set of benchmark Paulis $\mathcal{B}$ by solving a nonnegative least-squares problem in $\log(\hat{f})$. Nonnegative coefficients $\lambda$ can be found such that $M\lambda$ is as close to $-\log(f)$ as possible.

With embodiments, various methods of learning fidelities of Pauli channels are known and have been implemented experimentally. Generally, a noise process (e.g., the same noise process) is repeated up to d times and the corresponding Pauli expectation values are measured at various depths. The fidelities of the noise channel can then be extracted from the decay rates in the resulting curves in a way that is robust to state-preparation and measurement (SPAM) errors. Under mild conditions on the minimal fidelity of the noise channel and the level of SPAM errors, the result for the fidelities can be predicted via the following model: i) the channel can be represented with the model Paulis from set $\mathcal{K}$, , and ii) the channel fidelities for Paulis in $\mathcal{B}$ can be learned by benchmarking up to depth d with at least $2\epsilon^{-2} \log(2|\mathcal{B}|/\delta)$ circuit instances for each of the relevant measurement bases. Thus, it holds with probability at least $1-\delta$ that the estimates $\hat{f}_j$ of all fidelities $f_j$ can be bounded by $$C_\epsilon^{-\tau} \leq \hat{f}_j / f_j \leq C_{531}^\tau, \quad (4)$$

where $\tau = \sqrt{|\mathcal{K}| \cdot |\mathcal{B}|} / (\sigma_{min}(M(\mathcal{B}, \mathcal{K}))d)$, and $$C_\epsilon = \left(\frac{1 + 4\epsilon}{1 - 4\epsilon}\right).$$

In embodiments, such as generally illustrated by FIGS. 3A-3C and 4A-4C, the system 100 can learn the noise channel via a learning protocol. Further, the noise modeling component 102 and the noise shaping component 103 can employ the learning protocol and the sparse Pauli-Lindblad noise model, and additionally, can draw samples from the inverse noise model. The four-qubit layer with two cx gates on a 27-transmon-qubit, fixed-connectivity processor comprising a heavy-hex topology, with qubits as shown in FIG. 3B is benchmarked in FIG. 4A. Dynamical decoupling sequences can be applied by the system 100 during idle times of qubits in the layer. Various idle times can occur when one or more gates in the layer are faster (e.g., a degree of microseconds; for example about 10 to 100 μs) than the slowest gate, or when a qubit in the layer does not contain a gate. Dynamical decoupling can be applied to lessen the effects of decoherence and low-frequency noise during these idle periods; further, dynamical decoupling can also improve circuit fidelity. Repeated application of a noise channel in the context of self-adjoint two-qubit Clifford gates (e.g., such as cx and cz gates), can generally result in pairwise products of fidelities. Although inserting appropriate single-qubit gates between applications can increase the number of individual Pauli fidelities estimates, pairwise fidelities $f_a f_b$ remain, leading to indeterminacy of model coefficients. For example, the pairwise fidelity $f_a f_b$ can be expressed as $(\alpha f_a)(f_b/\alpha)$ for any $\alpha$. The indeterminacy can be addressed for instance by using direct estimation of missing fidelities by measuring a single layer, at the cost of an additive error in the estimate and sensitivity to state preparation and readout error, or by using symmetry relations that follow under the reasonable assumption on the noise.

Figure 4A:
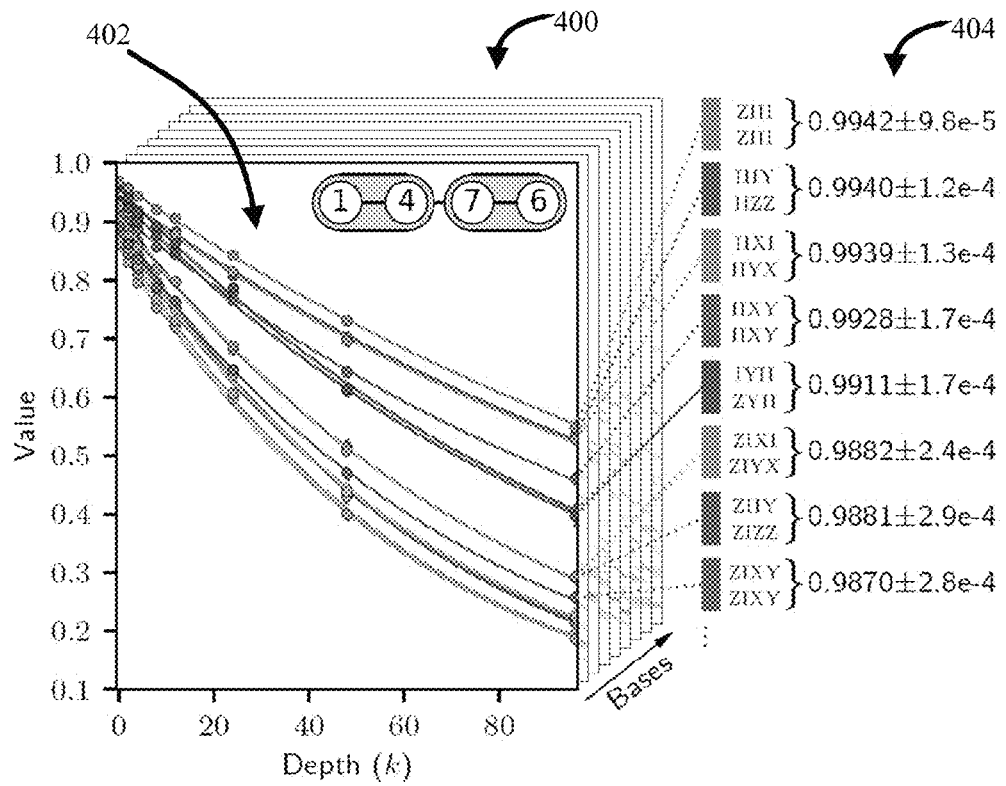
FIG. 4A illustrates a plot of fidelity estimates for one or more pairs along with standard deviation obtained using a 100-fold bootstrap, in accordance with one or more embodiments described herein.
Figure 4B:
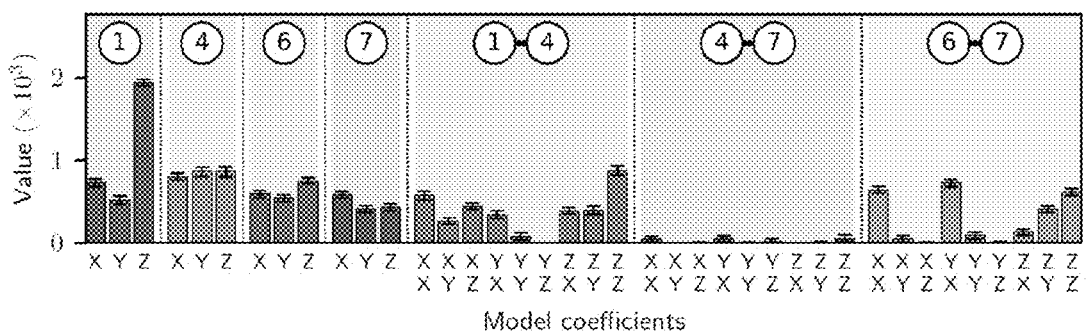
FIG. 4B illustrates a plot of model coefficients obtained using a nonnegative least-squares fit of the log fidelities, in accordance with one or more embodiments described herein.
Figure 4C:
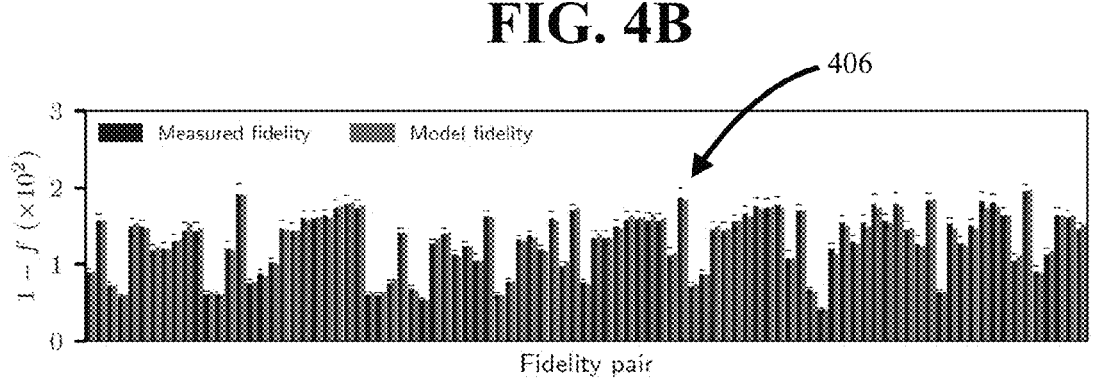
FIG. 4C illustrates a plot of one minus the fidelity for each of the measured fidelity pairs including error bars representing the standard deviation, in accordance with one or more embodiments described herein.

FIGS. 4A, 4B, and 4C illustrate a four-qubit layer for increasing depths (e.g., up to a depth d) in nine different bases to obtain data points. The noise modeling component 102 and the noise shaping component 103 can employ a learning protocol. Further, the learning protocol can include measuring a set of observables with increasing numbers of circuit repetitions k (e.g., even values) up to a maximum depth d. Measurements in nine different bases can be sampled, as shown by the stacked planes 400 of FIG. 4A. A fidelity of the form $\alpha_o (f_1 f_2)^{k/2}$ can be associated with each observable $P_o$, where $\alpha_o$ is a constant that captures the state-preparation and measurement error (e.g., offset value), and $f_1$ and $f_2$ are the fidelities of the noise channel for two Pauli terms. Values of the different fidelity pairs can be estimated in a consistent manner by fitting the data with exponentially decaying curves 402 for all observables that include the same pair, which can arise in multiple bases and possibly different observables, whose curves can have a different offset values $\alpha_o$. Table 404 of FIG. 4A illustrates fidelity estimates for several fidelity pairs along with standard deviations obtained using a 100-fold bootstrap.

Further, each data point in FIG. 4A represents an estimated observable in a given basis, averaged over 100 random circuit instances with 256 shots each (e.g., a 100-fold bootstrap). The data can be fit with exponentially decaying curves 402 corresponding to each unique fidelity pair $f_a f_b$. Further, the fidelities can be augmented with fidelity estimates resulting from the symmetry condition. Following augmentation of the fidelities, model coefficients can be obtained using an adapted nonnegative least-squares fitting procedure that uses the modified relation $\log(f_1 f_2) = -2(M_1 + M_2)\lambda$, to reflect the use of pairwise fidelities $f_a f_b$, as shown in FIG. 4B. In embodiments, FIG. 4C illustrates that the fidelities of the resulting model closely match the measured fidelities, thus indicating that the resulting model captures noise accurately. Further, FIG. 4C illustrates a plot of one minus the fidelity for each of the measured fidelity pairs including errors bars 406 representing the standard deviation (e.g., vertical lines in the error bars 406 are omitted for clarity), along with the corresponding fidelities from the learned noise model.

Figure 4D:
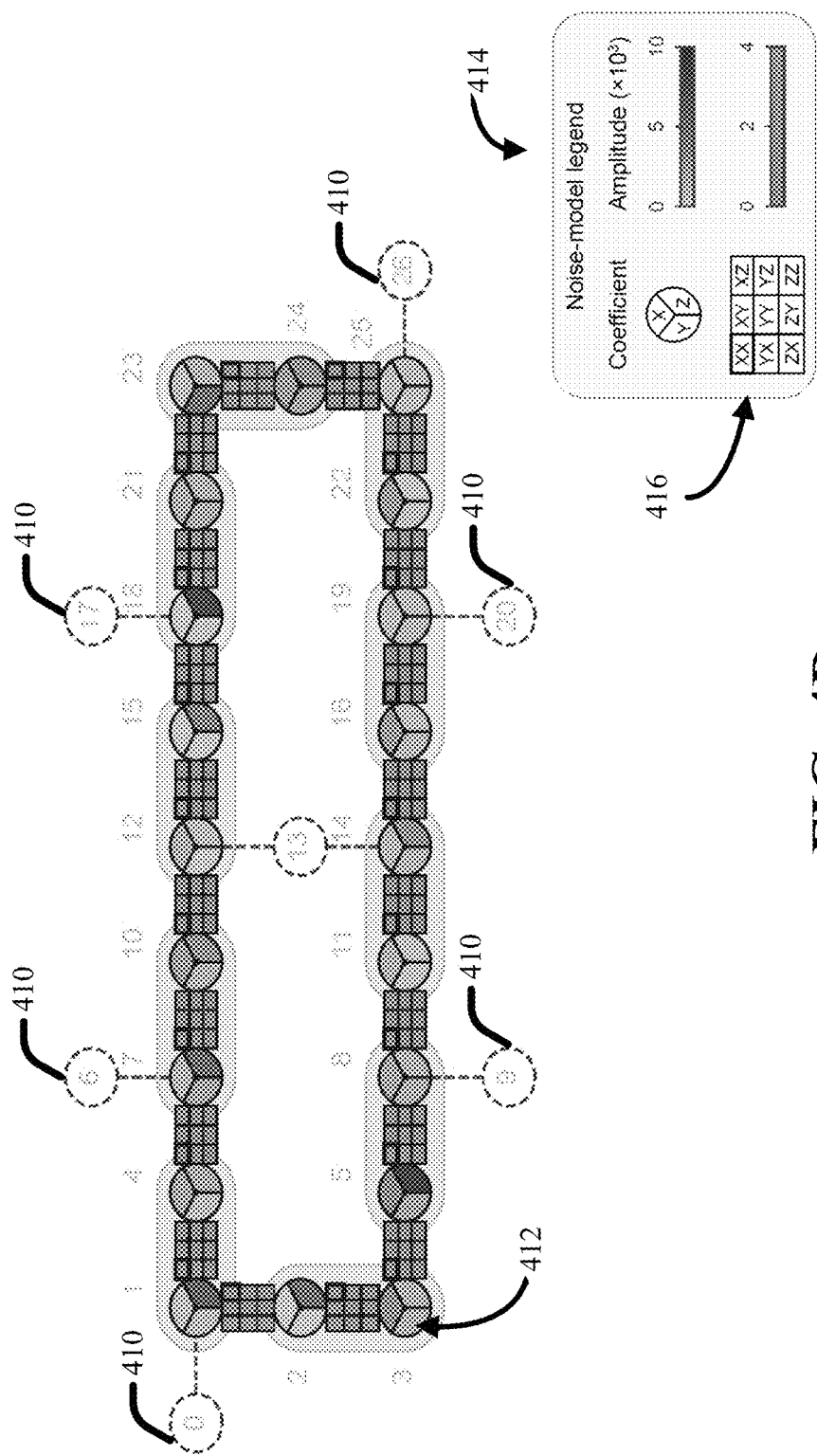
FIG. 4D illustrates a visual diagram of an example, non-limiting sparse noise model overlaid on quantum processor topology, in accordance with one or more embodiments described herein.

A visualization diagram is illustrated in FIG. 4D of the sparse noise model (e.g., the sparse Pauli-Lindblad error model) of a 20-qubit layer with 10 concurrent cx gates (shaded pairs) overlaid on the topology of the processor 136 (e.g., a quantum processor). As shown in FIG. 4D, the circles denote qubits 410, and the colored wedges 412 provide a visualization of the single-body X, Y, and Z Lindblad coefficients (as shown in legend 414). Two-body coefficients can be visually represented by a 3×3 matrix as shown by table 416 of FIG. 4D. Generally, FIG. 4D represents a visualization of the sparse-model coefficients as a map over the processor 136. A scalable benefit from the system 100 can be that learning the 20-qubit noise model of FIGS. 4A-4D takes the same (e.g., substantially the same) number of circuit instances as that of a 4-qubit model.

In embodiments, the system 100 can use the learned noise model (e.g., the sparse Pauli-Lindblad error model) to mitigate the noise using a probabilistic error cancellation (PEC) method. The PEC method can implement the channel inverse $\Lambda_i^{-1}$ through quasi-probabilistic sampling of each of the l layers. The inverse of the channel can be obtained by negating $\mathcal{L}$, leading to a non-physical map given by:

$$\Lambda^{-1}(\rho) = \exp[-\mathcal{L}](\rho) = \gamma \Pi_{k \in \mathcal{K}} (w_k - (1-w_k) P_k \cdot P_k^\dagger) \rho, \qquad (5)$$

with sampling overhead $\gamma = \exp(\Sigma_{k \in K} 2\lambda_k)$ as effectuated by the noise modeling component 102. The resulting product structure in Eq. (5) can allow for a direct way of sampling the map. For each $k \in \mathcal{K}$ the identity can be sampled (e.g., via the noise modeling component 102) with probability $w_k$, or the Pauli $P_k$ can be applied. The number of times m a non-identity Pauli is applied can be recorded to compute a final Pauli as the product of all sampled terms. A circuit instance can be constructed, via the noise modeling component 102, in which noisy layers are preceded with the corresponding sampled Pauli by repeating the steps of recording and computing for noise channels i=1, . . . , with respective $m_i$ and $\gamma_i$ values. The measurement outcome of the circuit instance can be multiplied by $\Pi_{i=1}^{l}(-1)^{m_i}\gamma_i$. On average, the multiplied outcome implements the inverse maps and produces an unbiased expectation value with sampling overhead $\gamma(l) = \Pi_{i=1}^{l}\gamma_i$ (e.g., the noise-model specific constant). An error bound on the final expectation value can be derived that considers the errors in all steps of the learning procedure. The bound states that, given a quantum circuit with l layers whose learning layer satisfies Eq. (2), it can be estimated that the ideal expectation value $\langle A \rangle$ of an observable A with $\|A\| > 1$ by the average mitigation estimate $\langle \hat{A}_N \rangle$ using N error-mitigated circuit instances, such that $$|\langle A \rangle - \langle \hat{A}_N \rangle| \leq (C_\in^{l\tau} - 1) + \lambda(l)\sqrt{2\log(2/\delta')/N} \qquad (6)$$

can be satisfied with probability at least $1-\delta'$. For modest noise, $C_\in$ can be expected to be close to one, which can lead to a scaling that is weakly exponential in l and τ. Further, the sampling overhead $\gamma(l)$ dictates the resources needed to obtain a reliable estimator.

Turning now to results from application of the system 100, time evolution of the one-dimensional transverse-field Ising model due to the Hamiltonian:

$$H = -J\Sigma_i Z_i Z_{i+1} + h\Sigma_j X_j = -JH_{ZZ} + hH_X, \qquad (7)$$

where J denotes the exchange coupling between neighboring spins and h represents the transverse magnetic field that can be considered. Unitary time evolution $e^{-iHt}$ can be approximated by a first-order Trotter decomposition $(e^{iJH_{ZZ}t/s}e^{-ihH_{X}t/s})^s$ with s segments. The time evolution can be performed on a linear chain of qubits, where the unitary $\exp(iJ(Z_jZ_{j+1})\delta_t)$ with $\delta_t=t/s$ as a quantum circuit consisting of an $R_Z(-2J\delta_t)$ rotation on qubit j+1 between two cx gates with control and target qubits j and j+1. Similarly, $\exp(-ihH_x\delta_t)$ can decompose into a product of single-qubit rotations $R_X(2h\delta_t)$ on each qubit j.

Figure 5A:
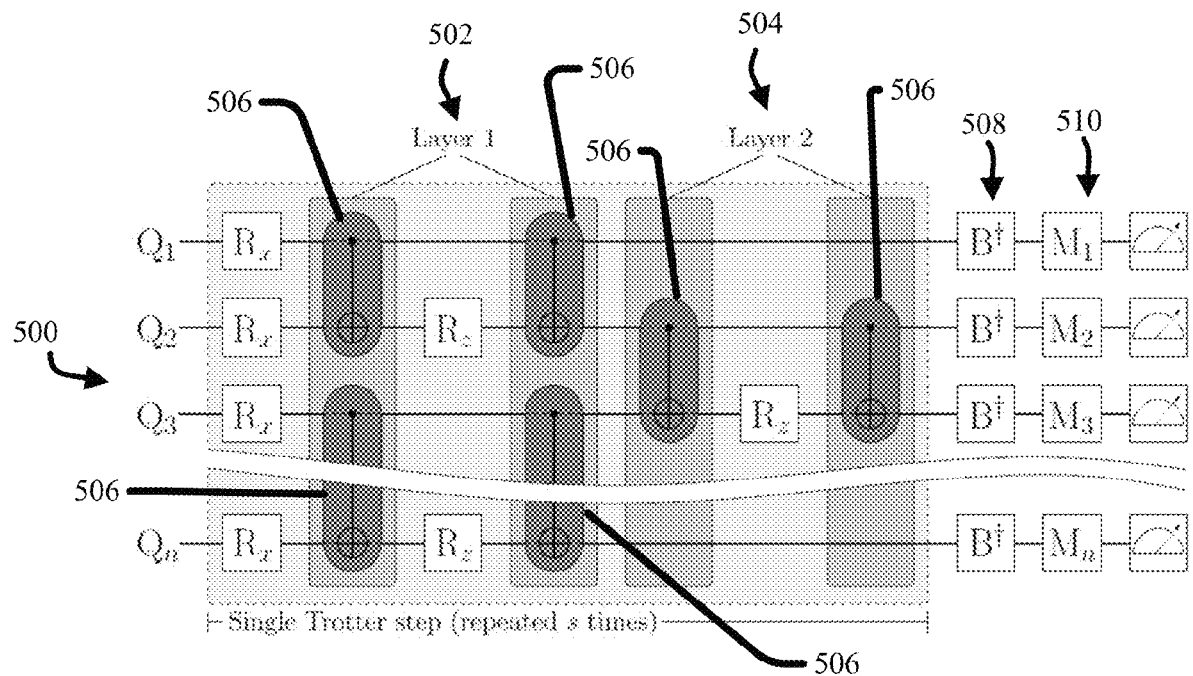
FIG. 5A illustrates a diagram of an example, non-limiting Trotter circuit for the Ising Hamiltonian over a one-dimensional n-qubit lattice, in accordance with one or more embodiments described herein.

For example and without limitation, the results can be circuits of the form shown in FIG. 5A. The circuit includes two unique layers 502, 504 of cx gates 506, where one starts at even locations in the qubit chain and one starts at odd locations in the qubit chain. Further, FIG. 5A shows a Trotter circuit for the Ising Hamiltonian in Eq. (7) over a one-dimensional n-qubit lattice 500. The Single layer Trotter step is repeated s times, with associated $R_X(2h\delta_t)$ and $R_Z(-2J\delta_t)$ rotations. Each step comprises two instances of two unique cx layers. The $B^\dagger$ gates 508 select the measurement basis, and the M gates 510 (measurement gates) can facilitate model-free readout-error mitigation (e.g., applied on one or more observables). To counter time-dependent fluctuations in the noise, the noise model can be relearned after fixed or variable time intervals. The final observables can be obtained after averaging.

Figure 5B:
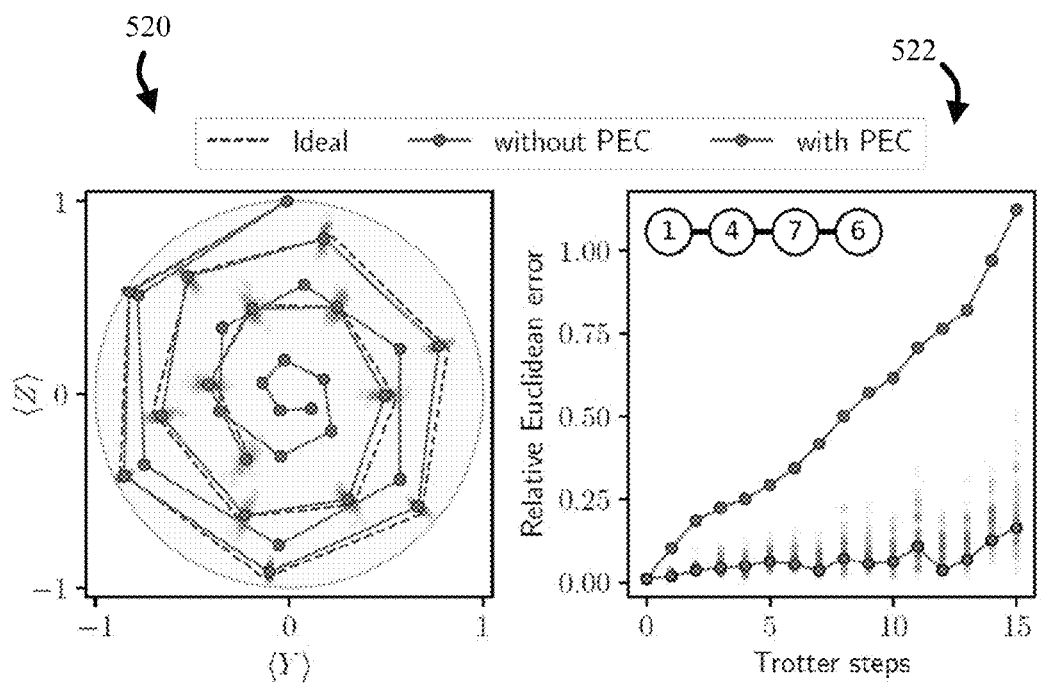
FIG. 5B illustrates diagrams showing Trotterized time evolution of the global magnetization shown in the Y-Z Bloch plane, and the error between ideal and measured magnetization vectors, in accordance with one or more embodiments described herein.

In embodiments, one or more experiments are shown in FIG. 5B, illustrating Ising-model dynamics (e.g., time evolution) for a spin lattice with and without probabilistic error correction (PEC) for 15 trotter steps (h=1, J=0.15, and δt=1/4). Turning back to FIGS. 4A-4C depicting a learning process of the first layer, such process resulted in factor γ=1.03. Thus, one or more models can be learned in a similar fashion. The number of mitigated circuit instances for each s=1, 2, . . . , 15 can be given by $\min(200, 40\cdot(\gamma_1\gamma_2)^{2s})$, where $\gamma_1$ and $\gamma_2$ are the sampling overhead factors for the first and second layer. The one or more circuit instances are each measured 1,024 times. For each of the s Trotter-steps, a global magnetization component $\langle Z \rangle_s$ can be computed as the overall average of all weight-one Pauli-Z observables, and likewise for $\langle X \rangle_s$ and $\langle Y \rangle_s$. FIG. 5B includes plots 520 and 522. Further, plot 520 illustrates the resulting Y and Z magnetization components in the Y-Z Bloch plane along with the results obtained without PEC and with exact simulation where:

$$M := \Sigma_n (\langle X_n \rangle, \langle Y_n \rangle, \langle Z_n \rangle)/N \quad (8)$$

Additionally as shown in FIG. 5B, plot 522 compares the relative Euclidean distance for the estimated and exact global magnetization. Further, the experimentally measured evolution (e.g., as indicated by dots and solid lines) can be compared to the ideal noise-free evolution (e.g., as indicated by dots and dashed lines). The bootstrap-estimated error distribution for each data point is indicated by clouds. The error between ideal and measured magnetization vectors, in terms of the relative Euclidean distance can be shown by $\|M-M_{ideal}\|_2/\|M_{ideal}\|_2$.

Figure 5C:
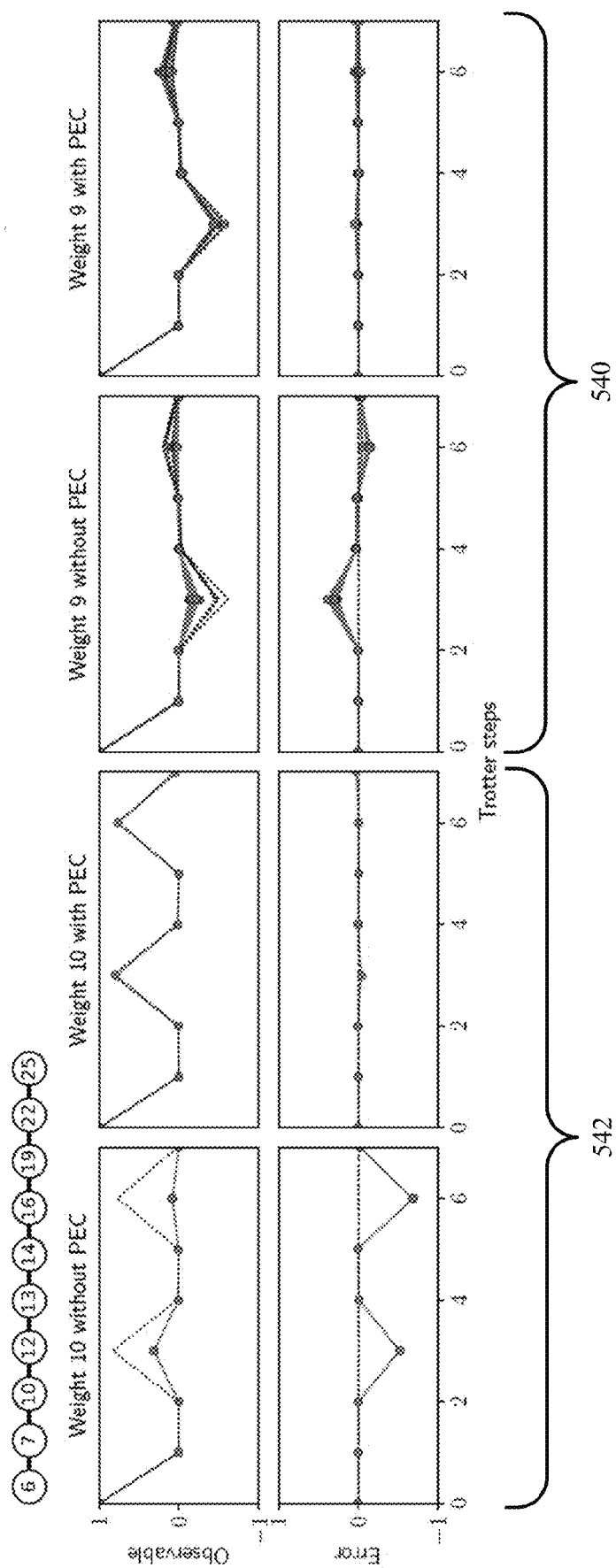
FIG. 5C illustrates time evolution of the Ising model on a one-dimensional ten-qubit lattice site with weight-9 and weight-10 Pauli-Z observables plotted along ground truth information, in accordance with one or more embodiments described herein.

With embodiments, one or more experiments are illustrated in FIG. 5C comparing the results for weight-9 540 and weight-10 542 Pauli-Z observables obtained with PEC and without PEC. The simulation experiment of FIG. 5C comprises a one-dimensional lattice on ten qubits with h=1 and J=0.5236 for up to seven Trotter steps. High-weight observables can be highly noise sensitive and serve as a demanding test of the system 100, where mitigated observables exhibit vanishing residuals.

Figure 6:
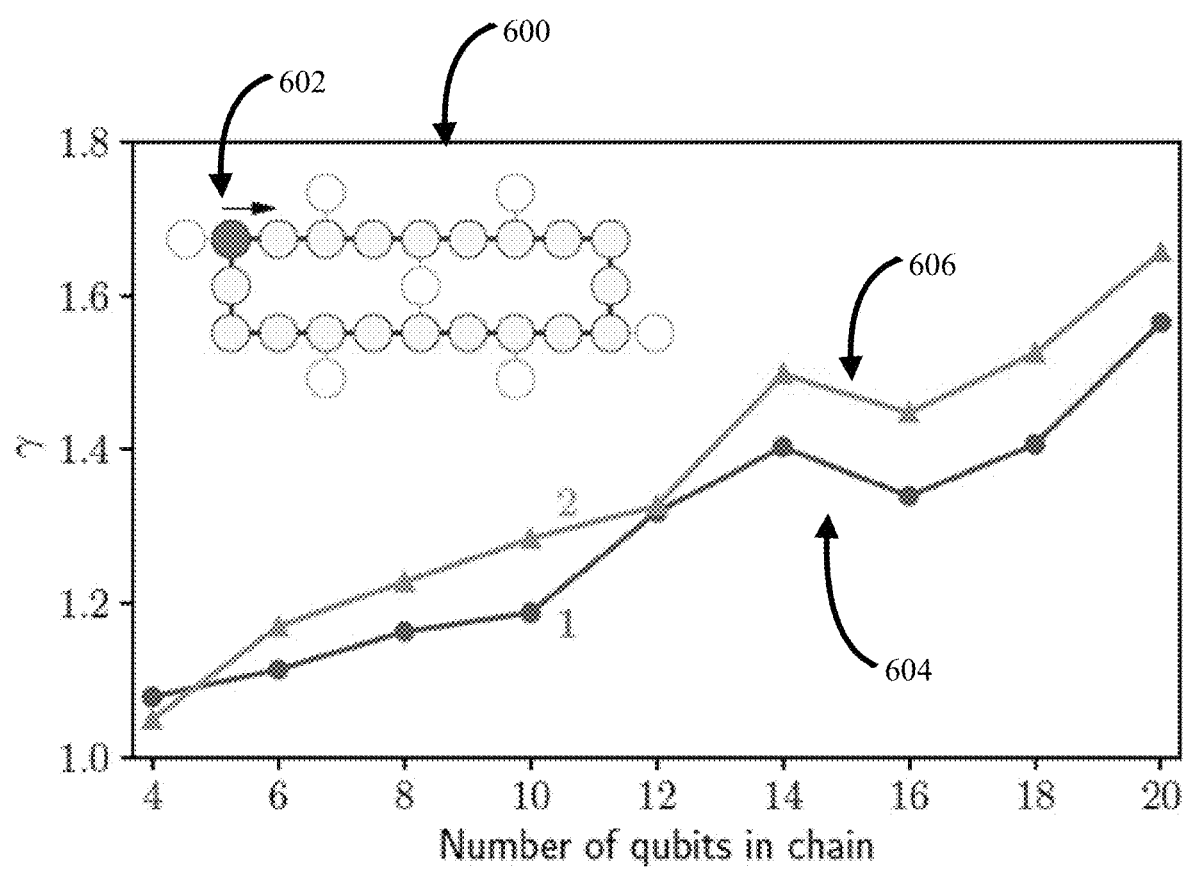
FIG. 6 illustrates a plot of sampling overhead γ for two Ising layers as a function of the number of qubits in the Ising lattice chain, in accordance with one or more embodiments described herein.

Further, the accuracy of the error-mitigated observables in FIGS. 5A-5D indicate the validity of the sparse noise model and learning protocol. However, the system 100 comprises one or more potential limitations, such as the sampling overhead factor γ(l). The variance in the estimator scales with the square of the sampling overhead factor γ(l). The sampling overhead factor γ(l) depends on the number of qubits (see, e.g., FIG. 6) as well as the circuit depth in terms of the number of layers. Additionally, an Ising lattice chain 600 is depicted where the first qubit 602 is shown and proceeds clockwise. A first layer 604 and a second layer 606 include complementary cx gates on alternating pairs of qubits in the chain (see, e.g., FIGS. 5A-5C). A qubit-and-depth-normalized version of the scaling factor can be defined as γ, allowing for the sampling overhead for l layers on n qubits as $\bar{\gamma}^{nl}$. The normalized parameter (e.g., $\bar{\gamma}$) can be used as a metric to represent quantum processor performance. Lower values of $\bar{\gamma}$ can indicate improvement in hardware quality, which translates into potentially dramatic decreases in the sampling overhead. In this manner, classical run-time overheads can be traded for tremendously improved quantum computation on noisy processors. Further, improving total circuit execution time can reduce the practical PEC overhead.

Experimental results of the system 100 demonstrate a practical path to extend probabilistic error cancellation to remove the noise-induced bias from the high-weight observable across the full circuit (see, e.g., FIG. 5C). The sparse-learning protocol can provide a versatile noise representation with rigorous theoretical bounds and near-constant learning with number of qubits, and an effective noise-inversion scheme. The accuracy of the model-reconstructed noise-fidelity pairs, as indicated in FIG. 5C, and the error mitigated observables validate the accuracy, efficiency, and scalability of the Lindbladian learning and/or the system 100.

Figure 7A:
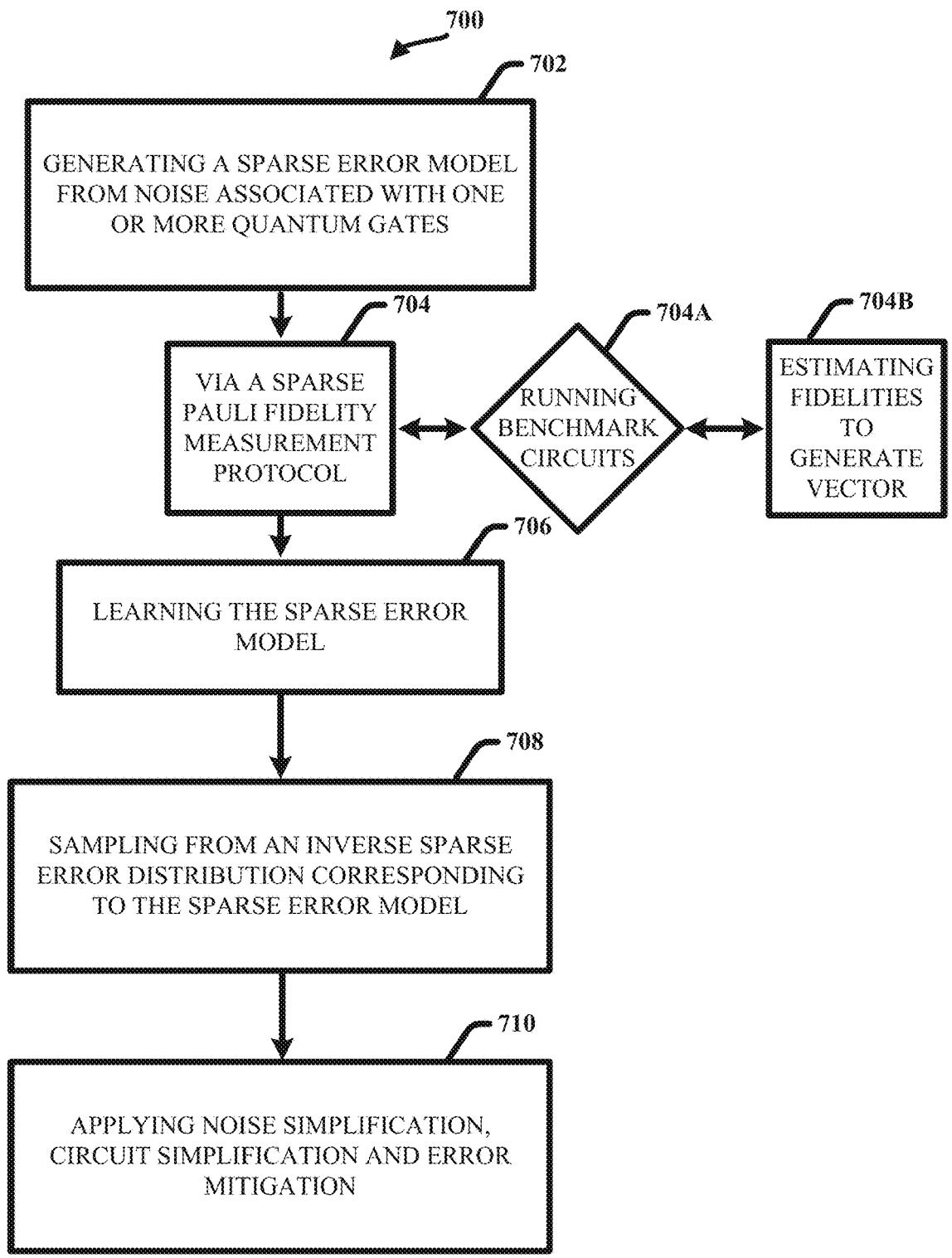
FIG. 7A illustrates a flow diagram of an example, non-limiting computer-implemented method that can mitigate errors associated with one or more quantum gates, in accordance with one or more embodiments described herein.
Figure 7B:
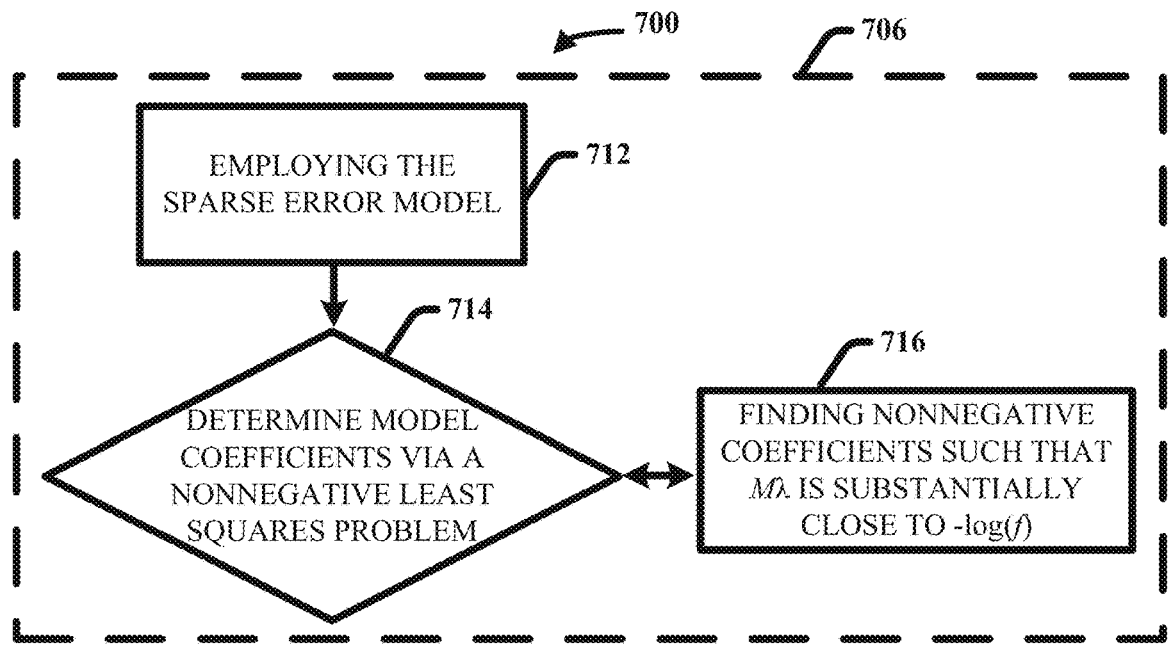
FIG. 7B illustrates a flow diagram of portions of an example, non-limiting computer-implemented method that can mitigate errors associated with one or more quantum gates, in accordance with one or more embodiments described herein.

FIGS. 7A and 7B illustrates a methodology in accordance with one or more embodiments of the subject application. While, for purposes of simplicity of explanation, the methodology shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

In embodiments as generally shown by the flow diagram of FIG. 7A, the example non-limiting computer implemented method 700 can mitigate errors associated with one or more quantum gates. For example and without limitation, the non-limiting computer implemented method 700 can comprise generating, using the processor 136, a sparse error model of the noise associated with one or more quantum gates (step 702). The non-limiting computer implemented method 700 can further employ, via the processor 136, a sparse Pauli fidelity measurement protocol (step 704) to generate the sparse error model (e.g., the sparse Pauli- Lindblad error model). In embodiments, the sparse Pauli fidelity measurement protocol (step 704) can further include running benchmark circuits at different depths for each measurement basis of the sparse model (704A); and estimating fidelities to generate the estimated fidelities vector (step 704B). Further, an estimation of fidelities is conducted in order to fit the Pauli-Lindblad noise model. Additionally, the non-limiting computer implemented method can include learning the sparse error model (e.g., via the noise modeling component 102 and the noise shaping component 103) (step 706). The non-limiting computer implemented method 700 can include sampling an inverse sparse error distribution corresponding to the sparse error model (e.g., a parsimonious error model) (step 708). Further, the method can apply estimated fidelity results (e.g., from sampling the inverse sparse error distribution) to predictively reduce errors in generating quantum expectation values for the system. Providing more accurate results can increase the number of qubits supported by the quantum processor (e.g., thus increasing processing time of the quantum processor and/or providing more accurate results for the quantum system). Given the fixed number of qubits a quantum system uses, it is advantageous to utilize the full capacity of the quantum processor by mitigating quantum errors in a predictive manner (e.g., via samples obtained from an inverse sparse error distribution of the noise associated with quantum gates). Integrating precited errors of the quantum gates can directly decrease computation time and improve expectation values of the quantum system. The non-limiting computer implemented method 700 can further include applying noise simplification, circuit simplification, and error mitigation (step 710).

Turning now to further description of learning the sparse error model, such as illustrated in FIG. 7B, learning the sparse error model (step 706) can include employing the sparse error model (step 712) and determining model coefficients via a nonnegative least squares problem (step 714). Determining model coefficients can allow the quantum system to apply a correlating noise specific constant to the quantum gates when running circuit instances thereby reducing noise on the output of the quantum circuit. The reduction of noise on the quantum gates of the quantum system can improve accuracy of results from the quantum system and/or faster computation time (e.g., where a higher percentage of qubits of the quantum system are used resulting in decreased idle qubits and reduce quantum noise). Further, learning the sparse error model (step 706) can include finding nonnegative coefficients such that MX, is substantially close to −log(f) (e.g., as close to −log(f) as possible) (step 716).

Figure 7C:
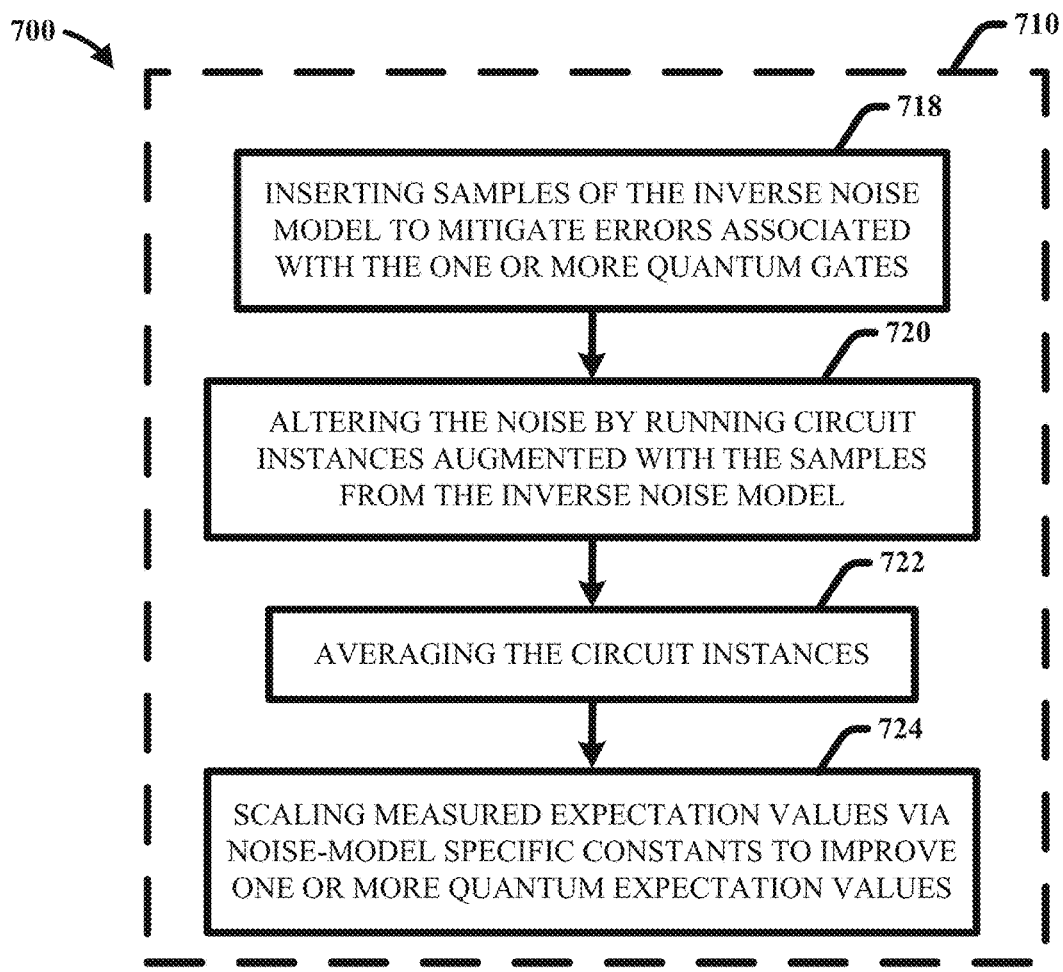
FIG. 7C illustrates a flow diagram of portions of an example, non-limiting computer-implemented method that can mitigate errors associated with one or more quantum gates, in accordance with one or more embodiments described herein.

In embodiments, FIG. 7C further illustrates the process of applying noise simplification, circuit simplification, and error mitigation (step 710). The non-limiting computer implemented method 700 can insert, using the processor 136, the samples from the inverse noise model to mitigate errors associated with the one or more quantum gates (step 718). The non-limiting computer implemented method 700 can include altering (e.g., changing, reducing, etc.) the effect of quantum noise on the quantum system by running shots of the quantum circuit augmented with the samples from the inverse noise model (step 720), which can be averaged (step 722). The samples can include a noise-model specific constant applied to the system 100 to directly reduce quantum noise and improve quantum expectation values. Further, the non-limiting computer implemented method 600 can comprise scaling, using the processor 136, measured expectation values via noise-model and sample specific constants to improve one or more quantum expectation values (step 724).

Increased result accuracy as a result of method 700 can lead to reduced computation time whereby more qubits of the system 100 are utilized (e.g., increasing accuracy and decreasing computation time).

Figure 8:
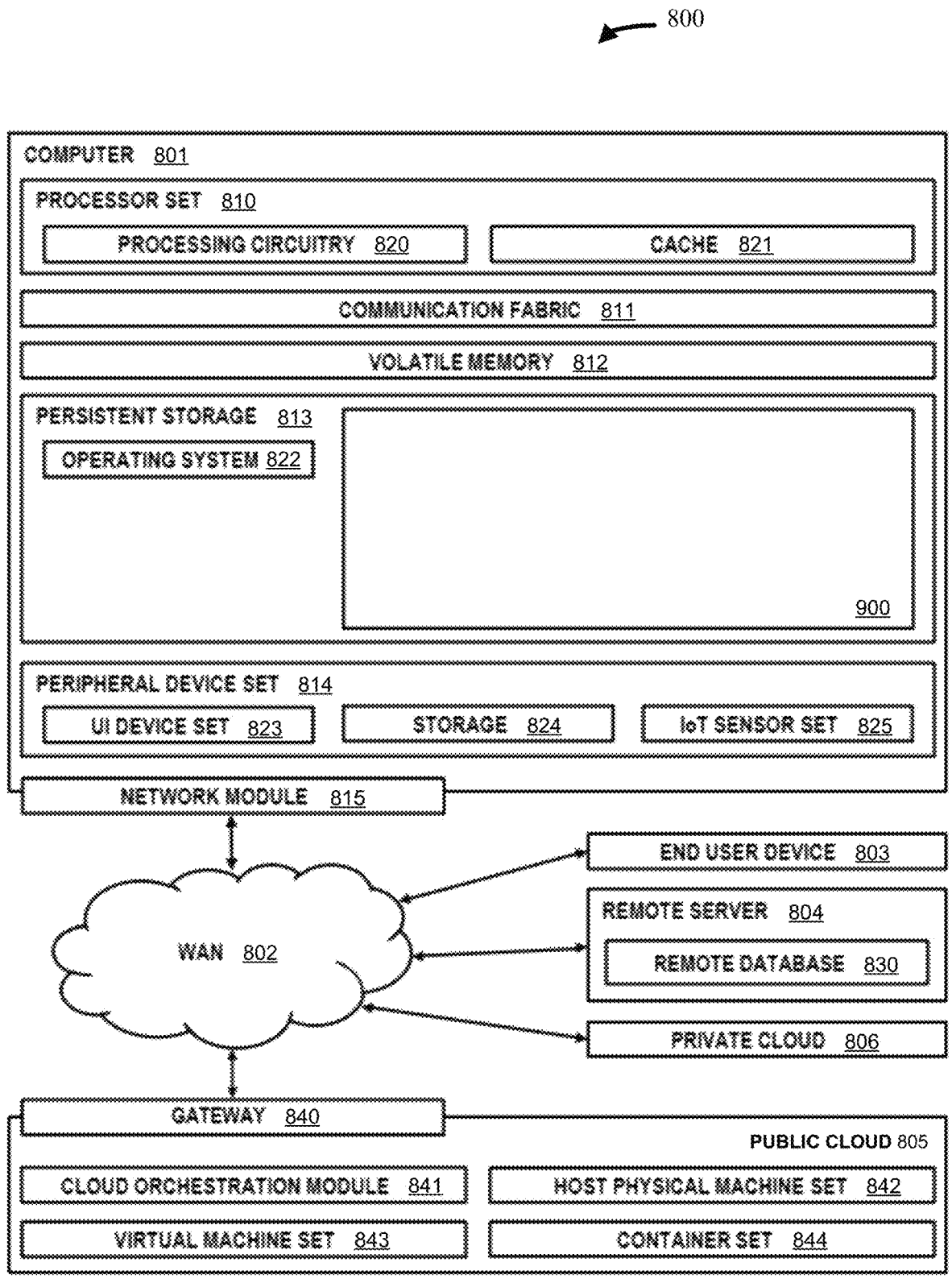
FIG. 8 illustrates a block diagram of an example, non-limiting operating environment in which one or more embodiments described herein can be facilitated.

Turning next to FIG. 8, a detailed description is provided of additional context for the one or more embodiments described herein at FIGS. 1-7.

FIG. 8 and the following discussion are intended to provide a brief, general description of a suitable computing environment 800 in which one or more embodiments described herein at FIGS. 1-7 can be implemented. For example, various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 800 contains an example of an environment for the execution of at least some of the computer code involved in performing the inventive methods, such as quantum error mitigation code block 900. In addition to block 900, computing environment 800 includes, for example, computer 801, wide area network (WAN) 802, end user device (EUD) 703, remote server 804, public cloud 805, and private cloud 806. In this embodiment, computer 801 includes processor set 810 (including processing circuitry 820 and cache 821), communication fabric 811, volatile memory 812, persistent storage 813 (including operating system 822 and block 900, as identified above), peripheral device set 814 (including user interface (UI) device set 823, storage 824, and Internet of Things (IoT) sensor set 825), and network module 815. Remote server 804 includes remote database 830. Public cloud 805 includes gateway 840, cloud orchestration module 841, host physical machine set 842, virtual machine set 843, and container set 844.

COMPUTER 801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method may be distributed among multiple computers and/or between multiple locations. On the other hand, in this presentation of computing environment 800, detailed discussion is focused on a single computer, specifically computer 801, to keep the presentation as simple as possible. Computer 801 may be located in a cloud, even though it is not shown in a cloud in FIG. 8. On the other hand, computer 801 is not required to be in a cloud except to any extent as may be affirmatively indicated.

PROCESSOR SET 810 includes one, or more, computer processors of any type now known or to be developed in the future. Processing circuitry 820 may be distributed over multiple packages, for example, multiple, coordinated integrated circuit chips. Processing circuitry 820 may implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set may be located "off chip." In some computing environments, processor set 810 may be designed for working with qubits and performing quantum computing.

Computer readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 821 and the other storage media discussed below. The program instructions, and associated data, are accessed by processor set 810 to control and direct performance of the inventive methods. In computing environment 800, at least some of the instructions for performing the inventive methods may be stored in block 900 in persistent storage 813.

COMMUNICATION FABRIC 811 is the signal conduction paths that allow the various components of computer 801 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 812 is any type of volatile memory now known or to be developed in the future. Examples include dynamic type random access memory (RAM) or static type RAM. Typically, the volatile memory is characterized by random access, but this is not required unless affirmatively indicated. In computer 801, the volatile memory 812 is located in a single package and is internal to computer 801, but, alternatively or additionally, the volatile memory may be distributed over multiple packages and/or located externally with respect to computer 801.

PERSISTENT STORAGE 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 may be a read only memory (ROM), but typically at least a portion of the persistent storage allows writing of data, deletion of data and re-writing of data. Some familiar forms of persistent storage include magnetic disks and solid state storage devices. Operating system 822 may take several forms, such as various known proprietary operating systems or open source Portable Operating System Interface type operating systems that employ a kernel. The code included in block 900 typically includes at least some of the computer code involved in performing the inventive methods.

PERIPHERAL DEVICE SET 814 includes the set of peripheral devices of computer 801. Data communication connections between the peripheral devices and the other components of computer 801 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 823 may include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 824 may be persistent and/or volatile. In some embodiments, storage 824 may take the form of a quantum computing storage device for storing data in the form of qubits. In embodiments where computer 801 is required to have a large amount of storage (for example, where computer 801 locally stores and manages a large database) then this storage may be provided by peripheral storage devices designed for storing very large amounts of data, such as a storage area network (SAN) that is shared by multiple, geographically distributed computers. IoT sensor set 825 is made up of sensors that can be used in Internet of Things applications. For example, one sensor may be a thermometer and another sensor may be a motion detector.

NETWORK MODULE 815 is the collection of computer software, hardware, and firmware that allows computer 801 to communicate with other computers through WAN 802. Network module 815 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (for example, embodiments that utilize software-defined networking (SDN)), the control functions and the forwarding functions of network module 815 are performed on physically separate devices, such that the control functions manage several different network hardware devices. Computer readable program instructions for performing the inventive methods can typically be downloaded to computer 801 from an external computer or external storage device through a network adapter card or network interface included in network module 815.

WAN 802 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 803 is any computer system that is used and controlled by an end user (for example, a customer of an enterprise that operates computer 801), and may take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In some embodiments, EUD 803 may be a client device, such as thin client, heavy client, mainframe computer, desktop computer and so on.

REMOTE SERVER 804 is any computer system that serves at least some data and/or functionality to computer 801. Remote server 804 may be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data may be provided to computer 801 from remote database 830 of remote server 804.

PUBLIC CLOUD 805 is any computer system available for use by multiple entities that provides on-demand availability of computer system resources and/or other computer capabilities, especially data storage (cloud storage) and computing power, without direct active management by the scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs may be stored as images and may be transferred among and between the various physical machine hosts, either as images or after instantiation of the VCE. Cloud orchestration module 841 manages the transfer and storage of images, deploys new instantiations of VCEs and manages active instantiations of VCE deployments. Gateway 840 is the collection of computer software, hardware, and firmware that allows public cloud 805 to communicate through WAN 802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 806 is similar to public cloud 805, except that the computing resources are only available for use by a single enterprise. While private cloud 806 is depicted as being in communication with WAN 802, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 805 and private cloud 806 are both part of a larger hybrid cloud.

The embodiments described herein can be directed to one or more of a system, a method, an apparatus or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network or a wireless network. The network can comprise copper transmission cables, optical transmission fibers, wireless transmission, routers, firewalls, switches, gateway computers or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, or source code or object code written in any combination of one or more programming languages, including an object oriented programming language such as Smalltalk, C++ or the like, or procedural programming languages, such as the "C" programming language or similar programming languages. The computer readable program instructions can execute entirely on the user's computer, partly on the user's computer, as a stand-alone software package, partly on the user's computer or partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In one or more embodiments, electronic circuitry including, for example, programmable logic circuitry, field-programmable gate arrays (FPGA) or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described herein with reference to flowchart illustrations or block diagrams of methods, apparatus (systems), and computer program products according to one or more embodiments described herein. It will be understood that each block of the flowchart illustrations or block diagrams, and combinations of blocks in the flowchart illustrations or block diagrams, can be implemented by computer readable program instructions. These computer readable program instructions can be provided to a processor of a general purpose computer, special purpose computer or other programmable data processing apparatus to produce a machine, such that the instructions, which execute via the processor of the computer or other programmable data processing apparatus, create means for implementing the functions/acts specified in the flowchart or block diagram block or blocks.

These computer readable program instructions can also be stored in a computer readable storage medium that can direct a computer, a programmable data processing apparatus or other devices to function in a particular manner, such that the computer readable storage medium having instructions stored therein comprises an article of manufacture including instructions which implement aspects of the function/act specified in the flowchart or block diagram block or blocks. The computer readable program instructions can also be loaded onto a computer, other programmable data processing apparatus or other device to cause a series of operational acts to be performed on the computer, other programmable apparatus or other device to produce a computer implemented process, such that the instructions which execute on the computer, other programmable apparatus or other device implement the functions/acts specified in the flowchart or block diagram block or blocks.

The flowcharts and block diagrams in the figures illustrate the architecture, functionality, and operation of possible implementations of systems, computer-implementable methods or computer program products according to one or more embodiments described herein. In this regard, each block in the flowchart or block diagrams can represent a module, segment or portion of instructions, which comprises one or more executable instructions for implementing the specified logical function(s). In one or more alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer or computers, those skilled in the art will recognize that the one or more embodiments herein also can be implemented in combination with other program modules. Generally, program modules include routines, programs, components, data structures or the like that perform particular tasks or implement particular abstract data types. Moreover, those skilled in the art will appreciate that the inventive computer-implemented methods can be practiced with other computer system configurations, including single-processor or multi-processor computer systems, mini-computing devices, mainframe computers, as well as computers, hand-held computing devices (e.g., PDA, phone), microprocessor-based or programmable consumer or industrial electronics or the like. The illustrated aspects can also be practiced in distributed computing environments in which tasks are performed by remote processing devices that are linked through a communications network. However, some, if not all aspects of the one or more embodiments can be practiced on stand-alone computers. In a distributed computing environment, program modules can be located in both local and remote memory storage devices.

As used in this application, the terms "component," "system," "platform," "interface," or the like, can refer to or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program or a computer. By way of illustration, both an application running on a server and the server can be a component. One or more components can reside within a process or thread of execution and a component can be localized on one computer or distributed between two or more computers. In another example, respective components can execute from various computer readable media having various data structures stored thereon. The components can communicate via local or remote processes such as in accordance with a signal having one or more data packets (e.g., data from one component interacting with another component in a local system, distributed system or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, where the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DR-RAM), direct Rambus dynamic RAM (DRDRAM) or Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing the one or more embodiments, but one of ordinary skill in the art can recognize that many further combinations and permutations of the one or more embodiments are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the one or more embodiments provided herein have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
   a memory that stores computer executable components; and
   a processor, operably coupled to the memory, and that executes at least one of the computer executable components that:
   generates a sparse Pauli-Lindblad error model of respective noise of layers comprising noisy two-qubit gates of a quantum circuit, wherein the quantum circuit comprises the layers comprising the noisy two-qubit gates interleaved with at least one layer comprising single-qubit gates;

generates an inverse noise model by negating coefficients of the sparse Pauli-Lindblad error model;

obtains samples from the inverse noise model;

inserts the samples into the quantum circuit to mitigate errors associated with one or more gates of the quantum circuit; and executes, via a quantum processor, instances of the quantum circuit comprising the samples from the inverse noise model to mitigate the errors.

2. The system of claim 1, wherein the at least one of the computer executable components further:

averages measured expectation values from the instances to generate averaged results; and scales the averaged results via a defined noise-specific constant.

3. The system of claim 2, wherein the at least one of the computer executable components further:

generates the sparse Pauli-Lindblad error model via a sparse Pauli fidelity measurement protocol.

4. The system of claim 1, wherein the sparse Pauli-Lindblad error model is a parsimonious error model.

5. The system of claim 1, the at least one of the computer executable components-further:

shapes the respective noise by twirling one or more gates of the quantum circuit to form a Pauli channel.

6. The system of claim 1, wherein the at least one of the computer executable components further:

regenerates the sparse Pauli-Lindblad error model at a defined time interval to counter time-dependent fluctuations of the respective noise.

7. The system of claim 1, wherein generating the sparse Pauli-Lindblad error model comprises:

learning the sparse Pauli-Lindblad error model based on running benchmark quantum circuits at different depths for a plurality of measurement bases.

8. A computer implemented method of mitigating quantum errors, comprising:

generating, by a system comprising a processor, generates a sparse Pauli-Lindblad error model of respective noise of layers comprising noisy two-qubit gates of a quantum circuit, wherein the quantum circuit comprises the layers comprising the noisy two-qubit gates interleaved with at least one layer comprising single-qubit gates;

generating, by the system, an inverse noise model by negating coefficients of the sparse Pauli-Lindblad error model;

obtaining, by the system, samples from the inverse noise model;

inserting, by the system, the samples into the quantum circuit to mitigate errors associated with one or more gates of the quantum circuit; and executing, by the system, via a quantum processor, instances of the quantum circuit comprising the samples from the inverse noise model to mitigate the errors.

9. The computer implemented method of claim 8, further comprising:

averaging, by the system, measured expectation values from the instances to generate averaged results; and scaling, by the system, the averaged results via a defined noise-specific constant.

10. The computer implemented method of claim 8, further comprising:

generating the sparse Pauli-Lindblad error model via a sparse Pauli fidelity measurement protocol.

11. The computer implemented method of claim 8, wherein the sparse Pauli-Lindblad error model is a parsimonious error model.

12. The computer implemented method of claim 8, further comprising:

shaping, by the system, the respective noise by twirling one or more gates of the quantum circuit to form a Pauli channel.

13. The computer implemented method of claim 8, further comprising:

regenerating, by the system, the sparse Pauli-Lindblad error model at a defined time interval to counter time-dependent fluctuations of the respective noise.

14. The computer implemented method of claim 8, wherein generating the sparse Pauli-Lindblad error model comprises:

learning the sparse Pauli-Lindblad error model based on running benchmark quantum circuits at different depths for a plurality of measurement bases.

15. A computer program product for mitigating quantum errors, the computer program product comprising a computer readable storage medium having program instructions embodied therewith, the program instructions executable by a processor to cause the processor to:

generate a sparse Pauli-Lindblad error model of respective noise of layers comprising noisy two-qubit gates of a quantum circuit, wherein the quantum circuit comprises the layers comprising the noisy two-qubit gates interleaved with at least one layer comprising single-qubit gates;

generate an inverse noise model by negating coefficients of the sparse Pauli-Lindblad error model;

obtain samples from the inverse noise model;

insert the samples into the quantum circuit to mitigate errors associated with one or more gates of the quantum circuit and execute, via a quantum processor, instances of the quantum circuit comprising the samples from the inverse noise model to mitigate the errors.

16. The computer program product of claim 15, wherein the program instructions further cause the processor to:

average measured expectation values from the instances to generate averaged results; and scale the averaged results via a defined noise-specific constant.

17. The computer program product of claim 15, wherein the program instructions further cause the processor to:

generate the sparse Pauli-Lindblad error model via a sparse Pauli fidelity measurement protocol.

18. The computer program product of claim 15, wherein the sparse Pauli-Lindblad error model is a parsimonious error model.

19. The computer program product of claim 15, wherein the program instructions further cause the processor to:

shape the respective noise by twirling one or more gates of the quantum circuit to form a Pauli channel.

20. The computer program product of claim 15, wherein the program instructions further cause the processor to:

regenerate the sparse Pauli-Lindblad error model at a defined time interval to counter time-dependent fluctuations of the respective noise.

* * * * *